(12) United States Patent
Kubota

(10) Patent No.: US 8,224,988 B2
(45) Date of Patent: Jul. 17, 2012

(54) NETWORK RELAY METHOD, NETWORK RELAY APPARATUS, AND NETWORK RELAY PROGRAM

(75) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 848 days.

(21) Appl. No.: 12/000,677

(22) Filed: Dec. 14, 2007

(65) Prior Publication Data

US 2008/0209071 A1    Aug. 28, 2008

(30) Foreign Application Priority Data

Dec. 18, 2006    (JP) .................................. 2006-339319

(51) Int. Cl.
*G06F 15/173* (2006.01)

(52) U.S. Cl. .......... 709/238; 709/220; 709/221; 709/22; 709/245

(58) Field of Classification Search .......... 709/220–222, 709/238, 245

See application file for complete search history.

(56) References Cited

U.S. PATENT DOCUMENTS

| | | | | |
|---|---|---|---|---|
| 6,928,478 | B1 * | 8/2005 | Gangadharan | 709/226 |
| 7,324,490 | B2 * | 1/2008 | Nishida et al. | 370/338 |
| 7,359,989 | B2 * | 4/2008 | Orava et al. | 709/245 |
| 7,756,140 | B2 * | 7/2010 | Matoba | 370/395.54 |
| 2001/0049825 | A1 * | 12/2001 | Hirose et al. | 725/111 |
| 2004/0006642 | A1 * | 1/2004 | Jang et al. | 709/245 |
| 2004/0014475 | A1 * | 1/2004 | Saito et al. | 455/445 |
| 2004/0148358 | A1 * | 7/2004 | Singh et al. | 709/207 |
| 2005/0050352 | A1 * | 3/2005 | Narayanaswami et al. | 713/201 |
| 2005/0163123 | A1 * | 7/2005 | Gangadharan | 370/392 |
| 2007/0026858 | A1 * | 2/2007 | Mizukoshi | 455/426.1 |
| 2007/0211653 | A1 * | 9/2007 | Mizukoshi | 370/312 |
| 2007/0280207 | A1 * | 12/2007 | Shimizu et al. | 370/353 |

FOREIGN PATENT DOCUMENTS

| | | | |
|---|---|---|---|
| JP | 2001-111544 | | 4/2001 |
| WO | WO 2005/086423 | * | 9/2005 |
| WO | WO 2005/086423 A1 | * | 9/2005 |

* cited by examiner

*Primary Examiner* — Asad Nawaz
*Assistant Examiner* — Sarah Drabik
(74) *Attorney, Agent, or Firm* — Staas & Halsey LLP

(57) ABSTRACT

According to an aspect of an embodiment, a method of relaying by network between a plurality of terminal devices and a relay device, comprising:
providing first address information corresponding to a first one of said terminal devices shared between said first terminal device and said relay device;
providing second address information used by the other terminal devices than said first terminal device for accessing via said relay device said first terminal device;
providing a table of said first address information and said second address information in association with each other at said relay device; and
changing the content of said first address information with time, said first address information enabling said relay device to access said first device, said relay device enabling other terminal devices to access said first terminal device by converting said first and second address information in reference to said table notwithstanding changing of the content of the first address information.

11 Claims, 40 Drawing Sheets

| VALID TIME | | MAC ADDRRESS |
|---|---|---|
| START TIME | END TIME | TERMINAL MAC |
| 2006/1/1 01:01:00 | 1 min | P |
| 2006/1/1 01:02:00 | 1 min | Q |
| 2006/1/1 01:03:00 | 1 min | R |
| 2006/1/1 01:04:00 | 1 min | S |
| ... | ... | ... |

Fig. 4B

| VALID TIME | | MAC ADDRRESS | |
|---|---|---|---|
| START TIME | END TIME | TERMINAL MAC | SUBSTITUTE MAC |
| 2006/1/1 01:01:00 | 1 min | P | A |
| 2006/1/1 01:02:00 | 1 min | Q | |
| ... | ... | ... | |

Fig. 4C

| IP | MAC |
|---|---|
| 1.1.1.3 | B |
| 1.1.1.1 | A |

Fig. 4D

| PORT | SETTING OF ON/OFF |
|---|---|
| 1 | ON |
| 2 | ON |
| 3 | OFF |

Fig. 5A

| VALID PERIOD |
|---|
| ONCE EVERY MINUTE |

Fig. 5B

| PORT | SUBSTITUTE MAC ADDRRESS |
|---|---|
| 1 | A |
| 2 | B |
| 3 | C |

Fig. 5C

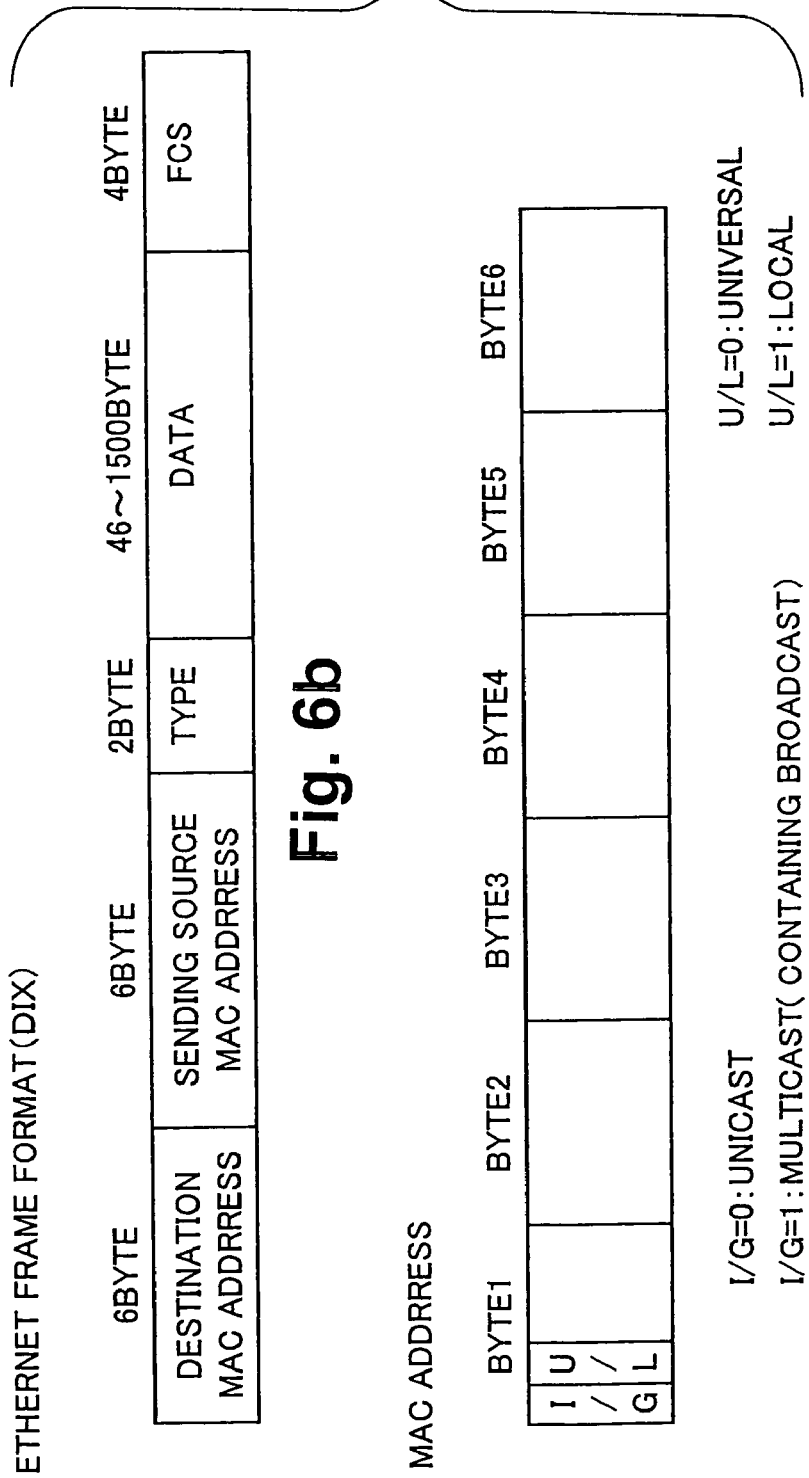

| VALUE | EAPoL PACKET TYPE | CONTENT |
|---|---|---|
| 0x00 | EAP-PACKET | EAP PACKET |
| 0x01 | EAPOL-START | EAPOL-START |
| 0x02 | EAPOL-LOGOFF | EAPOL-LOGOFF |
| 0x03 | EAPOL-KEY | EAPOL-KEY |
| 0x04 | EAPOL-ENCAPSULATED-ASF-ALERT | EAPOL-ENCAPSULATED-ASF-ALERT |
| 0xFF | PACKET TO BE USED WITH THE PRESENT EXAMPLE | PACKET TO BE USED WITH THE PRESENT EXAMPLE |

Fig. 11B — 16a

| VALID TIME | | MAC ADDRRESS | |
|---|---|---|---|
| START TIME | END TIME | TERMINAL MAC | SUBSTITUTE MAC |
| 2006/1/1 01:01:00 | 1 min | P | A |
| 2006/1/1 01:02:00 | 1 min | Q | |
| ... | | ... | |

Fig. 11C — 16b

| VALID TIME | | MAC ADDRRESS | |
|---|---|---|---|
| START TIME | END TIME | TERMINAL MAC | SUBSTITUTE MAC |
| 2006/1/1 01:01:00 | 1 min | X | B |
| 2006/1/1 01:02:00 | 1 min | Y | |
| ... | | ... | |

18a

| VALID TIME | | MAC ADDRRESS |
|---|---|---|
| START TIME | END TIME | TERMINAL MAC |
| 2006/1/1 01:01:00 | 1 min | P |
| 2006/1/1 01:02:00 | 1 min | Q |
| 2006/1/1 01:03:00 | 1 min | R |
| 2006/1/1 01:04:00 | 1 min | S |
| ... | ... | ... |

| VALID TIME | MAC ADDRRESS | |
|---|---|---|
| | TERMINAL MAC | SUBSTITUTE MAC |
| Now | P | A |
| Next | Q | |
| ... | ... | |

| VALID TIME | MAC ADDRRESS | |
|---|---|---|
| | TERMINAL MAC | SUBSTITUTE MAC |
| Prev | P | A |
| Now | Q | |
| ... | ... | |

Fig. 13D

| PORT | SETTING OF ON/OFF |
|---|---|
| 1 | ON |
| 2 | ON |
| 3 | OFF |

Fig. 17A

| VALID PERIOD |
|---|
| 100 FRAMES |

Fig. 17B

| PORT | SUBSTITUTE MAC ADDRRESS |
|---|---|
| 1 | A |
| 2 | B |
| 3 | C |

Fig. 17C

| VALID PERIOD | | MAC ADDRRESS |
|---|---|---|
| START TIME | END TIME | TERMINAL MAC |
| FRAME 001 | 100 FRAME | P |
| FRAME 101 | 100 FRAME | Q |
| FRAME 201 | 100 FRAME | R |
| FRAME 301 | 100 FRAME | S |
| ... | ... | ... |

| VALID TIME | | MAC ADDRRESS | |
|---|---|---|---|
| START TIME | END TIME | TERMINAL MAC | SUBSTITUTE MAC |
| FRAME 001 | 100 FRAME | P | A |
| FRAME 101 | 100 FRAME | Q | |
| ... | ... | ... | |

| VALID PERIOD | | MAC ADDRRESS |
|---|---|---|
| START TIME | END TIME | TERMINAL MAC |
| FRAME 001 | 100 FRAME | P |
| FRAME 101 | 100 FRAME | Q |

| VALID PERIOD | | MAC ADDRRESS |
|---|---|---|
| START TIME | END TIME | TERMINAL MAC |
| FRAME 201 | 100 FRAME | R |
| FRAME 301 | 100 FRAME | S |

| VALID PERIOD | | MAC ADDRRESS |
|---|---|---|
| START TIME | END TIME | POINTER |
| 2006/1/1 01:01:00 | 1 min | 1 |
| 2006/1/1 01:02:00 | 1 min | 0 |
| 2006/1/1 01:03:00 | 1 min | 3 |
| 2006/1/1 01:04:00 | 1 min | 2 |
| ... | ... | ... |

| INDEX | MAC ADDRRESS |
|---|---|
| 0 | Q |
| 1 | P |
| 2 | S |
| 3 | R |
| ... | ... |

| VALID PERIOD | | MAC ADDRRESS |
|---|---|---|
| START TIME | END TIME | POINTER |
| 2006/1/1 01:01:00 | 1 min | 1 |
| 2006/1/1 01:02:00 | 1 min | 0 |

| VALID PERIOD | | MAC ADDRRESS | |
|---|---|---|---|
| START TIME | END TIME | POINTER | SUBSTITUTE MAC |
| 2006/1/1 01:01:00 | 1 min | 1 | A |
| 2006/1/1 01:02:00 | 1 min | 0 | |

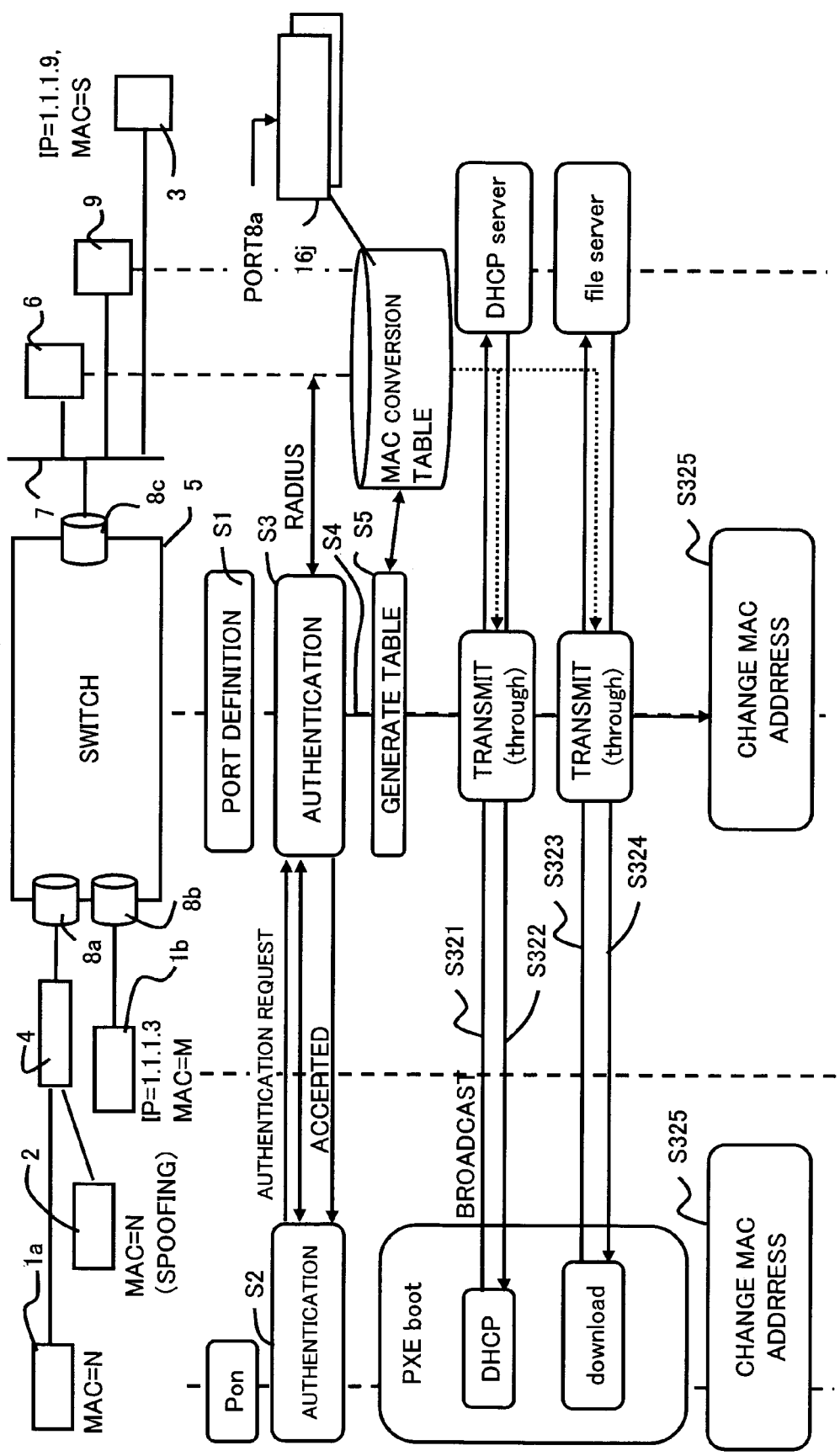

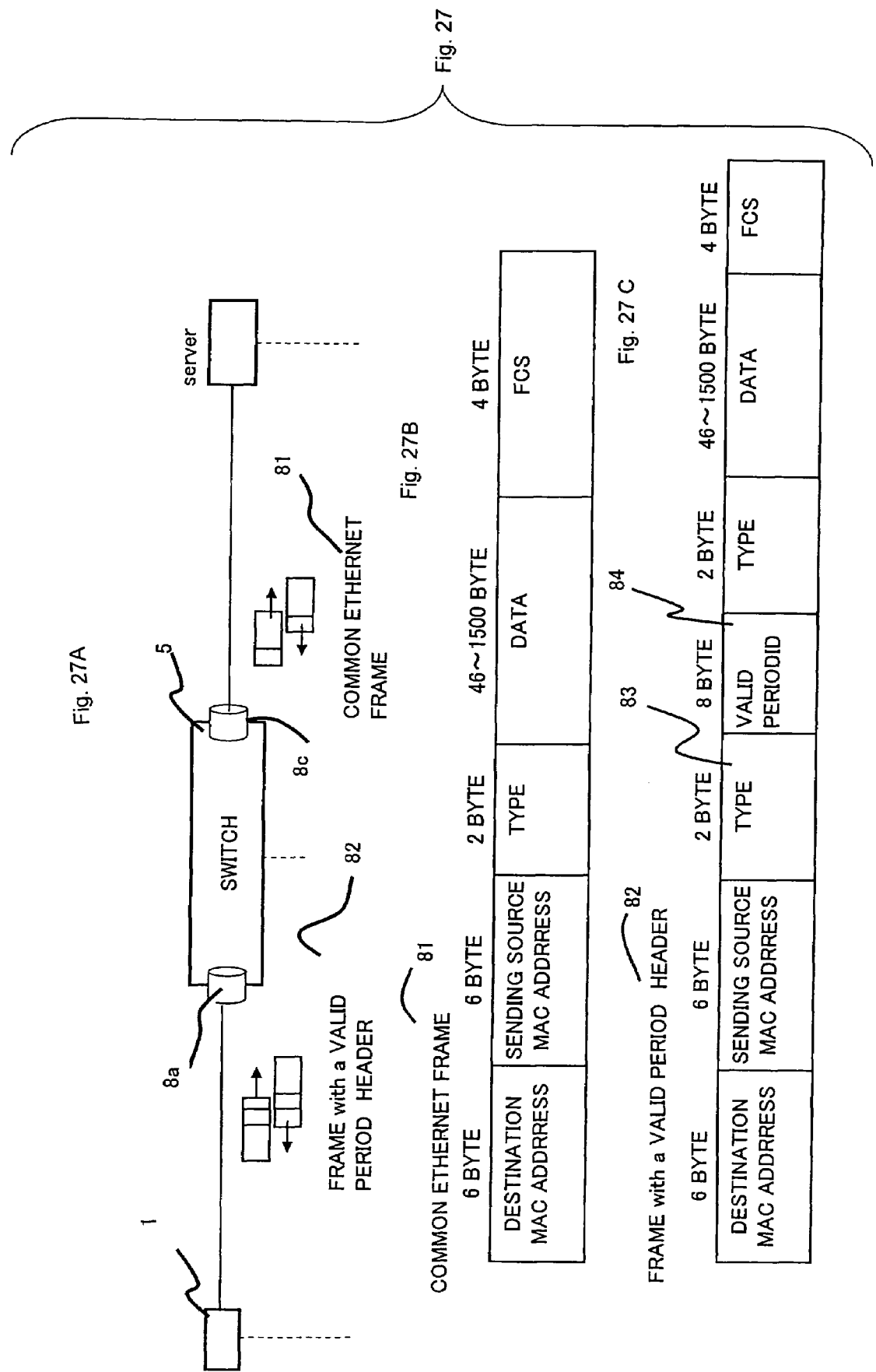

| PORT | AUTHENTICATION ON/OFF | MAC ADDRRESS CONERSION ON/OFF |
|---|---|---|
| 1 | ON | ON |
| 2 | ON | ON |
| 3 | ON | OFF |

Fig. 28

| VALID PERIOD | | MAC ADDRRESS |
| --- | --- | --- |
| START TIME | END TIME | TERMINAL MAC |
| 2006/1/1 01:01:00 | 1 min | P |
| 2006/1/1 01:02:00 | 1 min | Q |
| 2006/1/1 01:03:00 | 1 min | R |
| 2006/1/1 01:04:00 | 1 min | S |
| ... | ... | ... |

| VALID PERIOD | | MAC ADDRRESS |
| --- | --- | --- |
| START TIME | END TIME | TERMINAL MAC |
| 2006/1/1 01:01:00 | 1 min | F |
| 2006/1/1 01:02:00 | 1 min | G |
| 2006/1/1 01:03:00 | 1 min | H |
| 2006/1/1 01:04:00 | 1 min | I |
| ... | ... | ... |

| VALID PERIOD | | PORT | MAC ADDRRESS | |
| --- | --- | --- | --- | --- |
| START TIME | END TIME | | TERMINAL MAC | SUBSTITUTE MAC |
| 2006/1/1 01:01:00 | 1 min | 1 | P | A |
| 2006/1/1 01:02:00 | 1 min | | Q | |
| ... | ... | | ... | |

| VALID PERIOD | | PORT | MAC ADDRRESS | |
| --- | --- | --- | --- | --- |
| START TIME | END TIME | | TERMINAL MAC | SUBSTITUTE MAC |
| 2006/1/1 01:01:00 | 1 min | 1 | F | B |
| 2006/1/1 01:02:00 | 1 min | | G | |
| ... | ... | | ... | |

Fig. 29E

NETWORK RELAY METHOD, NETWORK RELAY APPARATUS, AND NETWORK RELAY PROGRAM

BACKGROUND OF THE INVENTION

1. Field of the Invention

The present invention relates to a network relay program, a network relay apparatus, a communication system, and a network relay method, whereby spoofing another terminal by faking a Media Access Control address (MAC address) of a terminal is prevented.

2. Description of the Related Art

In recent years, many major companies in particular have been introducing the IEEE (Institute of Electrical and Electronic Engineers) 802.1x authentication system, in order to improve security. IEEE802.1x is a protocol arranged to allow only an authenticated user (authorized user) to access a network. With IEEE802.1x, an authentication server and an authentication switch (authenticator) cooperate to authenticate a terminal (supplicant).

Note that as for a conventional technique relating to the present invention, there is an authentication method arranged to update an MAC address table of the access points of a wireless Local Area Network (LAN) (e.g., see Japanese Unexamined Patent Application Publication No. 2001-111544).

SUMMARY OF THE INVENTION

According to an aspect of an embodiment, a method of relaying by network between a plurality of terminal devices and a relay device, comprising:

providing first address information corresponding to a first one of said terminal devices shared between said first terminal device and said relay device;

providing second address information used by the other terminal devices than said first terminal device for accessing via said relay device said first terminal device;

providing a table of said first address information and said second address information in association with each other at said relay device; and changing the content of said first address information with time, said first address information enabling said relay device to access said first device, said relay device enabling other terminal devices to access said first terminal device by converting said first and second address information in reference to said table notwithstanding changing of the content of the first address information.

BRIEF DESCRIPTION OF THE DRAWINGS

FIG. 4A, FIG. 4B, FIG. 4C, and FIG. 4D constitute a sequence diagram illustrating one example of the operation of MAC address conversion processing in a case A of a communication system according to the first embodiment;

FIG. 5A, FIG. 5B, and FIG. 5C constitute a screen illustrating one example of setting UIs according to the first embodiment;

FIG. 6, including FIG. 6a, and FIG. 6b, constitute a screen illustrating an Ethernet frame format and the position of an I/G flag;

FIG. 11A, FIG. 11B, and FIG. 11C constitute a sequence diagram illustrating one example of the operation of MAC address conversion processing in a case B of a communication system according to the first embodiment;

FIG. 13A, FIG. 13B, FIG. 13C, and FIG. 13D constitute a sequence diagram illustrating one example of the operation of change rule notification processing according to a second embodiment;

FIG. 17A, FIG. 17B, and FIG. 17C constitute a screen illustrating one example of setting UIs according to the fourth embodiment;

FIG. 18A, FIG. 18B, FIG. 18C, FIG. 18D, and FIG. 18E constitute a sequence diagram illustrating one example of the operation of change rule notification processing according to the fourth embodiment;

FIG. 21A, FIG. 21B, FIG. 21C, FIG. 21D, and FIG. 21E constitute a sequence diagram illustrating one example of the operation of change rule notification processing according to the seventh embodiment;

FIG. 26A and FIG. 26B constitute a sequence diagram illustrating one example of the operation of a communication system according to a tenth embodiment;

FIG. 27, including FIG. 27A, FIG. 27B and FIG. 27C, is a diagram illustrating one example of a frame format according to an eleventh embodiment;

FIG. 28 is a screen illustrating one example of a port setting UI according to a twelfth embodiment;

FIG. 29A, FIG. 29B FIG. 29C FIG. 29D, and FIG. 29E constitute a sequence diagram illustrating one example of the operation of a communication system according to a thirteenth embodiment.

DETAILED DESCRIPTION OF THE PREFERRED EMBODIMENTS

Description will be made below regarding embodiments of the present invention with reference to the drawings.

First Embodiment

With the first embodiment, description will be made regarding a case wherein, with a communication system in which a terminal (communication apparatus) is connected to an authentication switch (network relay apparatus), time synchronization is made between the terminal and the authentication switch.

First, description will be made regarding the configuration of an authentication switch according to the present embodiment.

Figure 1:
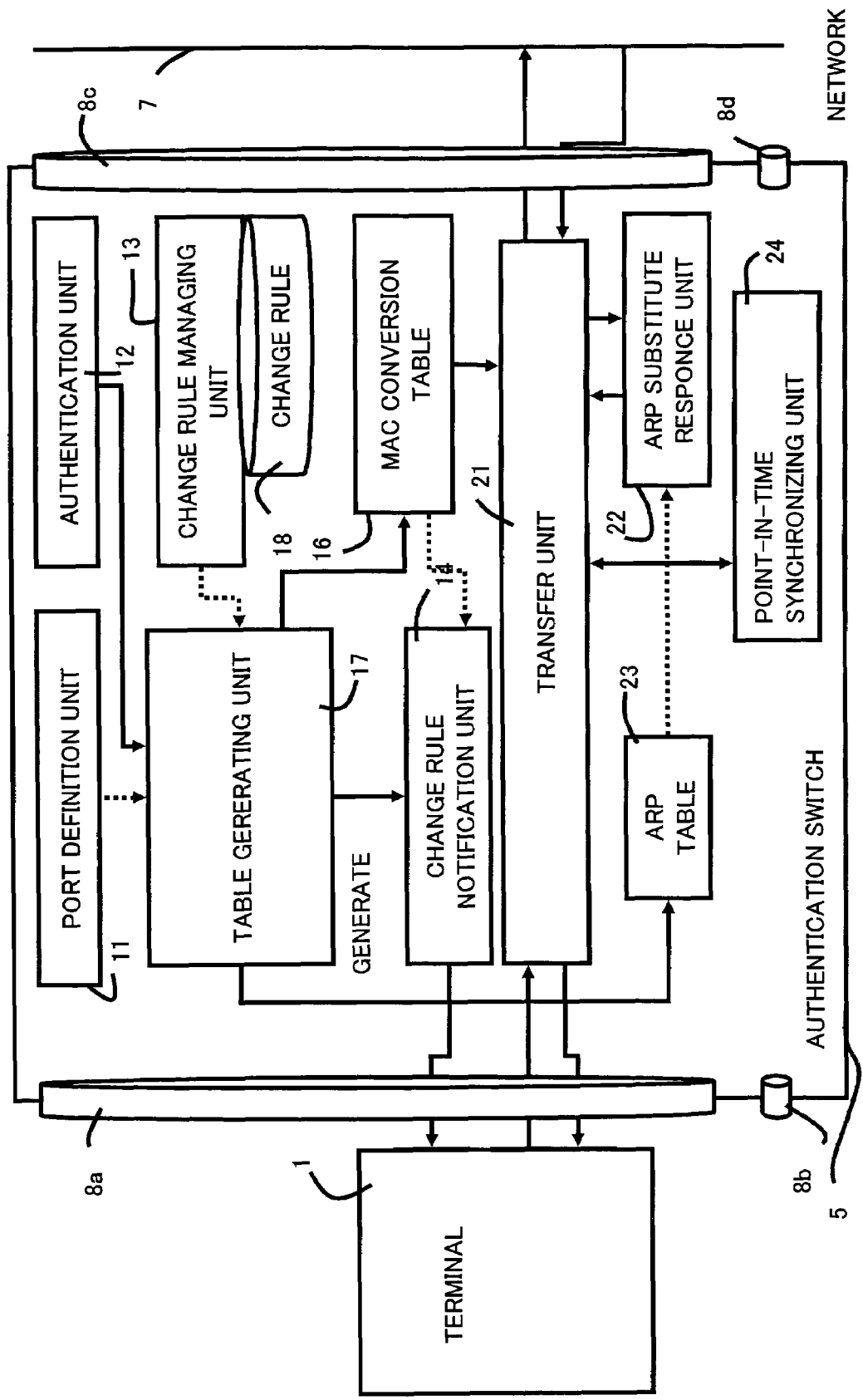
FIG. 1 is a block diagram illustrating one example of the configuration of an authentication switch according to a first embodiment.

FIG. 1 is a block diagram illustrating one example of the configuration of the authentication switch according to the first embodiment. An authentication switch 5 is connected to a terminal 1. Description will be made below regarding the overview of each unit of the authentication switch 5.

A port definition unit 11 is configured to define ON/OFF of an authentication function as to ports 8a, 8b, 8c, and 8d on the authentication switch 5. The ports 8a, 8b, 8c, and 8d are physical ports or logical ports configured to perform transfer depending on various types of protocol layers such as Internet Protocol (hereafter, referred to as IP), Virtual LAN (hereafter, referred to as VLAN), and Link Aggregation. Hereafter, the port which is set to ON by the port definition unit 11 will be referred to as an ON-set port, and the port which is set to OFF will be referred to as an OFF-set port. An authentication unit 12 is means configured to perform the existing Institute of Electrical and Electronic Engineers (hereafter, referred to as IEEE) 802.1x authentication, which performs authentication with the terminal 1 under an ON-set port, and in the event that authentication has been accepted, the terminal Media Access Control address (hereafter, referred to as MAC address) of the terminal 1 (the MAC address the terminal uses as its own MAC address) is allowed to pass through the relevant port. A change rule management unit 13 manages a terminal MAC address and valid period thereof (change start/end timing as to the relevant address) as a change rule 18. A change rule notification unit 14 prohibits other terminals from browsing by encryption or the like, and then notifies an authenticated terminal under an ON-set port of a change rule 19 which is a necessary portion of the change rule 18.

A MAC conversion table 16 correlates a change rule with a substitute MAC address assigned to an authenticated terminal. A substitute MAC address is a unique fixed MAC address within a Local Area Network (hereafter, referred to as LAN) to be assigned to a terminal under an ON-set port. With the terminal MAC address and substitute MAC address assigned to a certain terminal Ia under an ON-set port, the terminal Ia employs the terminal MAC address as its own MAC address, and the apparatuses other than the terminal Ia, which are connected to the authentication switch 5, employ the substitute MAC address as the MAC address of the terminal Ia. A table generating unit 17 generates an MAC conversion table 16.

A transfer unit 21 performs the following operation at the time of transfer.

(a) In the event that the receiving port of a frame is an ON-set port, the transfer unit 21 rewrites the sending source MAC address within the frame in accordance with the MAC conversion table 16. In the event that the sending source MAC address within the frame is not registered in the MAC conversion table 16, the transfer unit 21 discards the frame.

(b) In the event that the received frame is an Address Resolution Protocol (hereafter, referred to as ARP) request, the transfer unit 21 transfers the frame to an ARP substitute response unit 22.

(c) In the event that the sending port of a frame is an ON-set port, the transfer unit 21 rewrites the destination MAC address within the frame in accordance with the MAC conversion table 16. Also, the transfer unit 21 transfers no ARP request to the ON-set port.

The ARP substitute response unit 22 executes the ARP response of an authenticated terminal by proxy with reference to an ARP table 23. That is to say, in the event that the received frame is an ARP request regarding the IP address of an authenticated terminal, the authentication switch 5 responds with the substitute MAC address. A point-in-time synchronizing unit 24 performs point-in-time synchronization using the Network Time Protocol (NTP) or the like.

Next, description will be made regarding the configuration of the terminal 1 according to the present embodiment.

Figure 2:
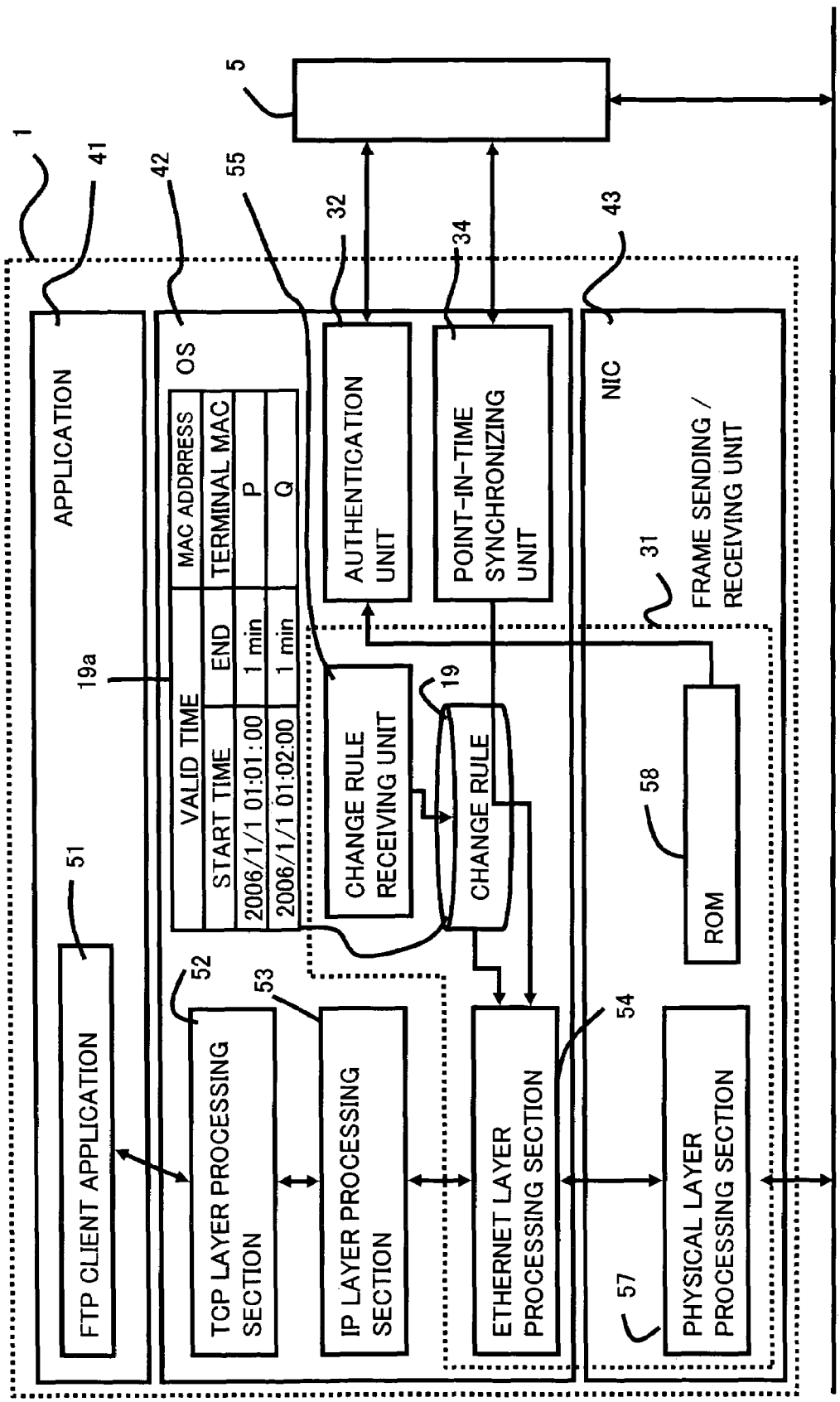
FIG. 2 is a block diagram illustrating a first example of the configuration of a terminal according to the first embodiment.

FIG. 2 is a block diagram illustrating a first example of the configuration of a terminal according to the first embodiment. The terminal 1 is connected to the authentication switch 5. The terminal 1 includes an application 41, an Operating System (OS) 42, and a Network Interface Card (NIC) 43. The application 41 includes, for example, a File Transport Protocol (FTP) client application 51. The OS 42 includes a TCP layer processing section 52 arranged to perform the processing of a Transmission Control Protocol (TCP) layer, an IP layer processing section 53 arranged to perform the processing of an IP layer, an Ethernet layer processing section 54 arranged to perform the processing of an Ethernet layer, a change rule receiving unit 55 configured to receive a change rule from the authentication switch 5, a change rule 19 received and stored from the authentication switch 5, an authentication unit 32 configured to perform authentication with the authentication switch 5, and a point-in-time synchronizing unit 34 configured to perform point-in-time synchronization using the NTP or the like. The NIC 43 includes a physical layer processing section 57 arranged to perform the processing of a physical layer, and Read Only Memory (ROM) 58 configured to store a unique terminal MAC address provided at the time of manufacturing the NIC 43.

The Ethernet layer processing section 54, change rule receiving unit 55, change rule 19, physical layer processing section 57, and ROM 58 make up a frame sending/receiving unit 31. The frame sending/receiving unit 31 sends or receives a frame via the authentication switch 5 while changing the terminal MAC address every moment in accordance with the change rule 19. Also, a change rule 19a illustrates the content of two minutes worth received.

Now, description will be made regarding another example of the configuration of the terminal 1 according to the present embodiment.

Figure 3:
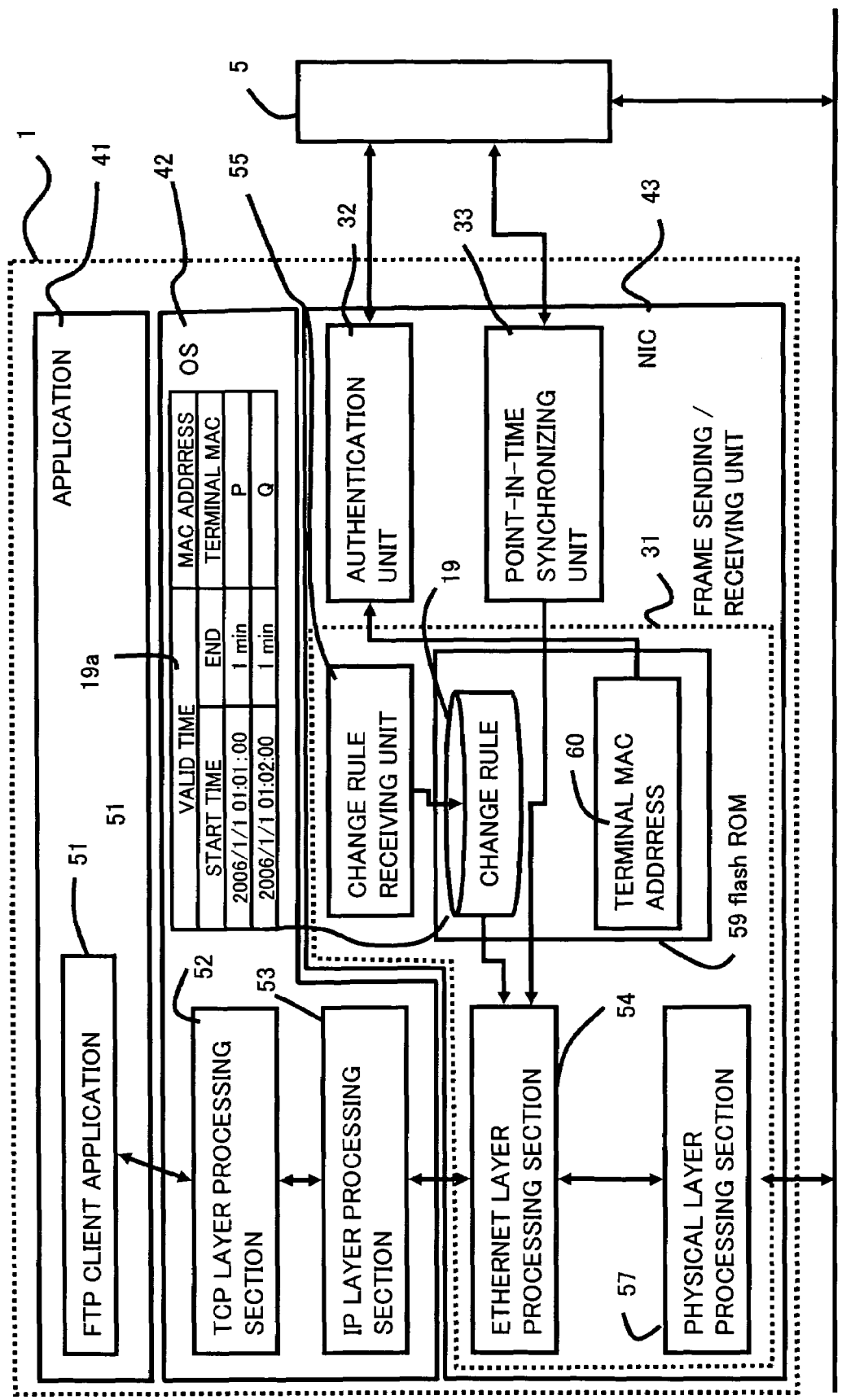
FIG. 3 is a block diagram illustrating a second example of the configuration of a terminal according to the first embodiment.
Figure 4A:
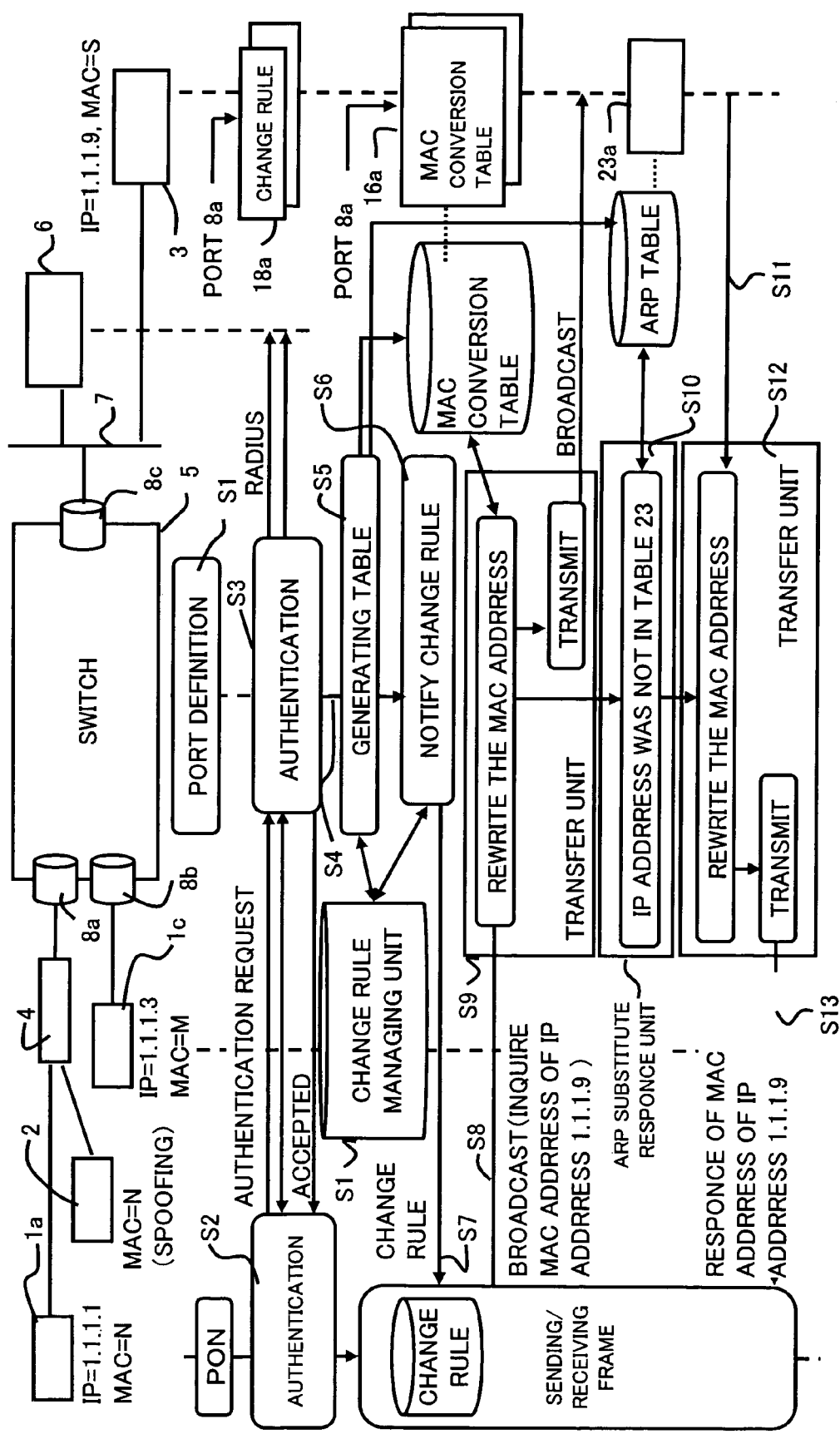

FIG. 3 is a block diagram illustrating a second example of the configuration of a terminal according to the first embodiment. The same reference numerals as those in FIG. 2 represent the same objects or equivalent objects shown in FIG. 2, so description thereof will be omitted here. The Ethernet processing section 54, change rule receiving unit 55, and change rule 19 which are included in the OS 42 in FIG. 2 are included in the NIC 43. Also, the change rule 19, and a unique terminal MAC address 60 to be provided at the time of manufacturing the NIC 43, are stored in flash ROM 59. The Ethernet layer processing section 54, change rule receiving unit 55, physical layer processing section 57, and flash ROM 59 make up the frame sending/receiving unit 31.

According to the point-in-time synchronizing unit 24 and point-in-time synchronizing unit 34, the point in time at the terminal 1 and the point in time at the authentication switch 5, which are employed for sending or receiving of a frame, are synchronized.

Next, description will be made regarding the operation of the MAC address conversion processing of the communication system using the authentication switch 5 by dividing into three cases (cases A, B, and C).

First, description will be made regarding the case A.

Figure 30:
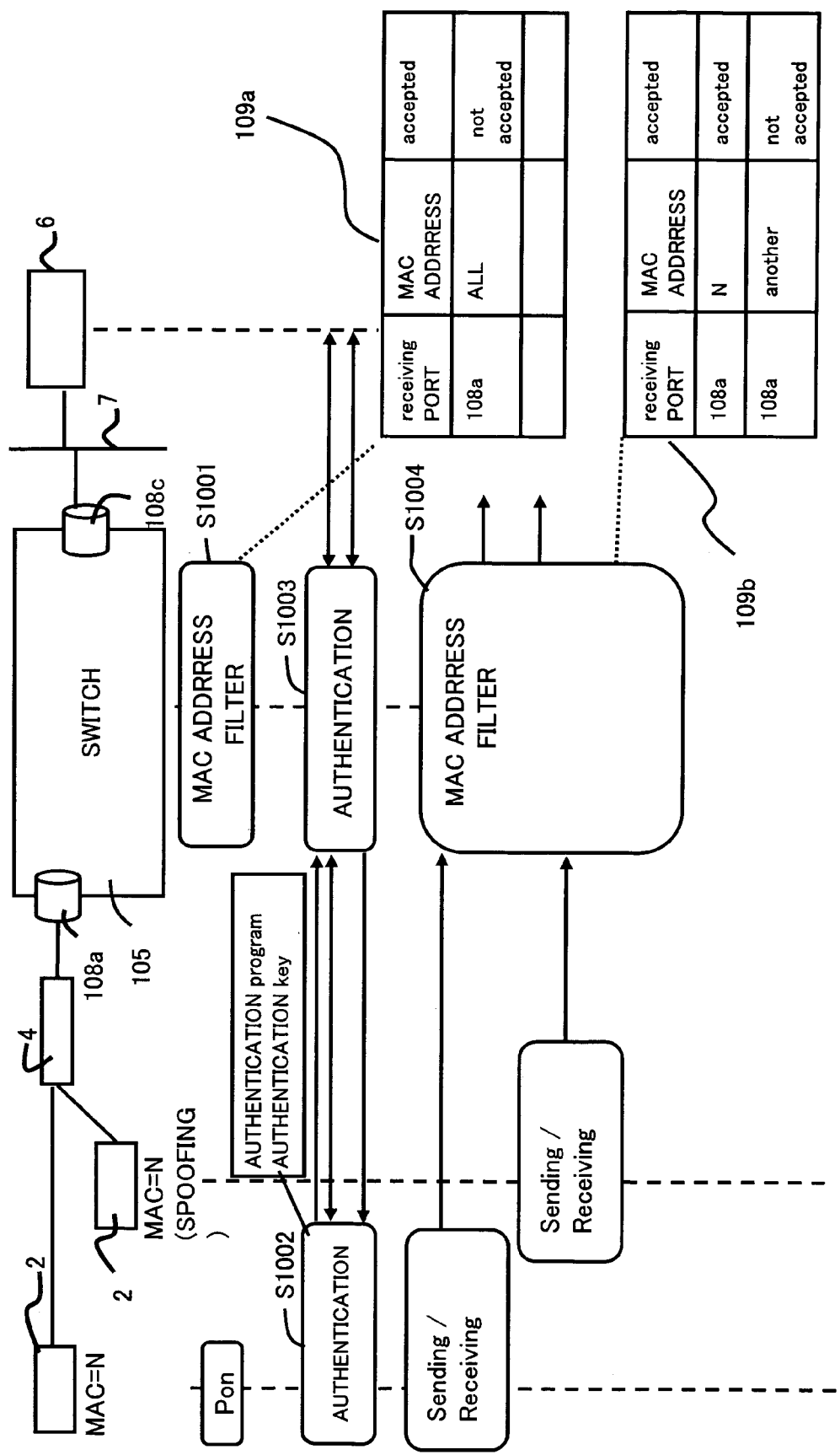
FIG. 30 is a sequence diagram illustrating one example of the operation of a communication system prior to application of the present example thereto.

FIG. 4A, FIG. 4B, FIG. 4C, and FIG. 4D constitute a sequence diagram illustrating one example of the operation of MAC address conversion processing in the case A of a communication system according to the first embodiment. In this drawing, the same reference numerals as those in FIG. 30 represent the same objects or equivalent objects shown in FIG. 30, so description thereof will be omitted here. The case A is a case wherein the authorized terminal Ia performs communication with the server 3 on the same LAN as that of the authentication switch 5. This drawing illustrates the operations of the terminal Ia (MAC address unique to the apparatus=N, IP address=1.1.1.1), authentication switch 5, a Remote Authentication Dial-In User Service (RADIUS) server 6, and server 3 (MAC address unique to the apparatus=S, IP address=1.1.1.9). Here, the terminal Ia and the terminal 1 are equivalent.

First, description will be made regarding the operation of preparation processing for communication (S1 through S7).

(S1) First, before a terminal actually communicates, the port definition unit 11, change rule management unit 13, and table generating unit 17 perform settings by providing a setting User Interface (UI) to the administrator of the authentication switch 5. FIG. 5A, FIG. 5B, and FIG. 5C constitute a screen illustrating one example of setting UIs according to the first embodiment. The setting UIs are made up of a port setting UI by the port definition unit 11, an MAC address valid period setting UI by the change rule management unit 13, and a substitute MAC address setting UI by the table generating unit 17. With the port setting UI, setting of ON/OFF is performed for each port number. With the MAC address valid period setting UI, the setting of the valid period of an MAC address is performed. With the substitute MAC address setting UI, the setting of a substitute MAC address is performed for each port number.

Let us say that the administrator has performed the following settings through each setting UI.

Setting, Port definition setting UI: ports 8a and 8b=ON, port 8c=OFF in FIG. 5A.

Setting, MAC address valid period setting UI: once every minute in FIG. 5B.

Setting, Substitute MAC address setting UI: port 8a=A, port 8b=B, port 8c=C in FIG. 5C.

The change rule management unit 13 automatically generates a change rule 18a for 10 minutes worth as to each ON-set port such that a terminal MAC address is changed once every minute. Also, the change rule management unit 13 repeats the same processing until 10 minutes elapse. The reason why multiple change rules are generated at once is to perform the notification of a change rule, and switching of the MAC address table 16 without delay, and the interval of automatic generation may be an interval different from this example. The algorithm of automatic generation may be any algorithm as long as it prevents a user from readily anticipating an MAC address. Also, a terminal MAC address is in a link local, so an arbitrary value may be set thereto. An example of the algorithm of the change rule management unit 13 will be shown below.

(a) A random number generating program generates a 6-byte random number value.

(b) In the event that the I (Individual)/G (Group) flag value of the generated value of a terminal MAC address is 0 (Unicast), the generated value is employed as a terminal MAC address.

(c) In the event that the I/G flag value of the generated value of a terminal MAC address is 1 (Multicast), random number generation is repeated until the flag value becomes 0 (Unicast).

FIG. 6, including FIG. 6a, and FIG. 6b, constitute a screen illustrating an Ethernet frame format and the position of the I/G flag. Note that instead of automatically generating an address, an arrangement may be made wherein the administrator inputs multiple MAC address candidates at the setting UI, and the algorithm selects an. MAC address from the candidates.

(S2) Next, let us say that the power of the terminal Ia under the port 8a is turned on by the user. The terminal Ia performs authentication with the authentication switch 5 using the existing IEEE802.1x and Extensible Authentication Protocol (EAP)-Transport Layer Security (TLS). At this time, the sending source MAC address used by the terminal Ia is an existing address, i.e., the MAC address=N printed in the ROM of the NIC at the terminal Ia. The destination MAC address is the MAC address 01:80:C2:00:00:03 for authentication request of IEEE802.1x.

(S3) The authentication switch 5 determines whether or not authentication can be performed in cooperation with the RADIUS server 6. Now, a case wherein authentication has been accepted is assumed. The authentication switch 5 notifies the terminal Ia that authentication has been accepted in accordance with the existing authentication procedure.

(S4) The authentication switch 5 further activates the table generating unit 17 since the port 8a which has exchanged this authentication is an ON-set port.

(S5) The table generating unit 17 generates a MAC conversion table 16. The substitute MAC address employed here is the setting value by the substitute MAC address setting UI. The table generating unit 17 generates an MAC conversion table 16a using the relevant setting value and the change rule 18a which the change rule management unit generated. One example of generation results is illustrated in the MAC conversion table 16a. With the method of entry registration, several minutes worth may be integrated and registered, or an arrangement may be made wherein registration is made one minute at a time (by a pair of a valid period and an MAC address), the next change rule is registered immediately before the valid period expires. In this example, the table generating unit 17 registers the entry of every two minutes worth in the MAC conversion table 16a.

The table generating unit 17 further generates an ARP table 23 for the ARP substitute response unit 22 regarding the terminals under an ON-set port. The generation of the ARP table 23 is performed by obtaining the IP address corresponding to the MAC address N using the existing RARP. One example of generation results is shown in an ARP table 23a. The value to be registered in this table is not the MAC address N but the setting value A by the MAC address setting UI. Note that the automatic generation of the ARP table is not indispensable, so for example, the administrator may input this table manually.

Following generation of the MAC conversion table 16 and ARP table 23, the change rule notification unit 14 is activated. Subsequently, the table generating unit 17 repeats the above-mentioned processing before the valid period of the terminal MAC address expires.

Figures 7, 8:
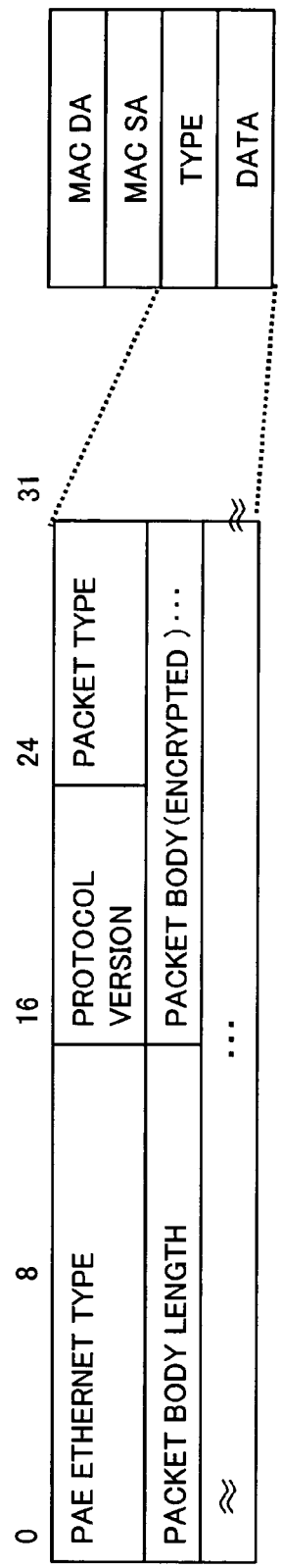
FIG. 7 is a screen illustrating one example of the frame format of an encrypted frame according to the first embodiment.
FIG. 8 is a screen illustrating one example of the packet type of an encrypted frame according to the first embodiment.
Figure 9A:
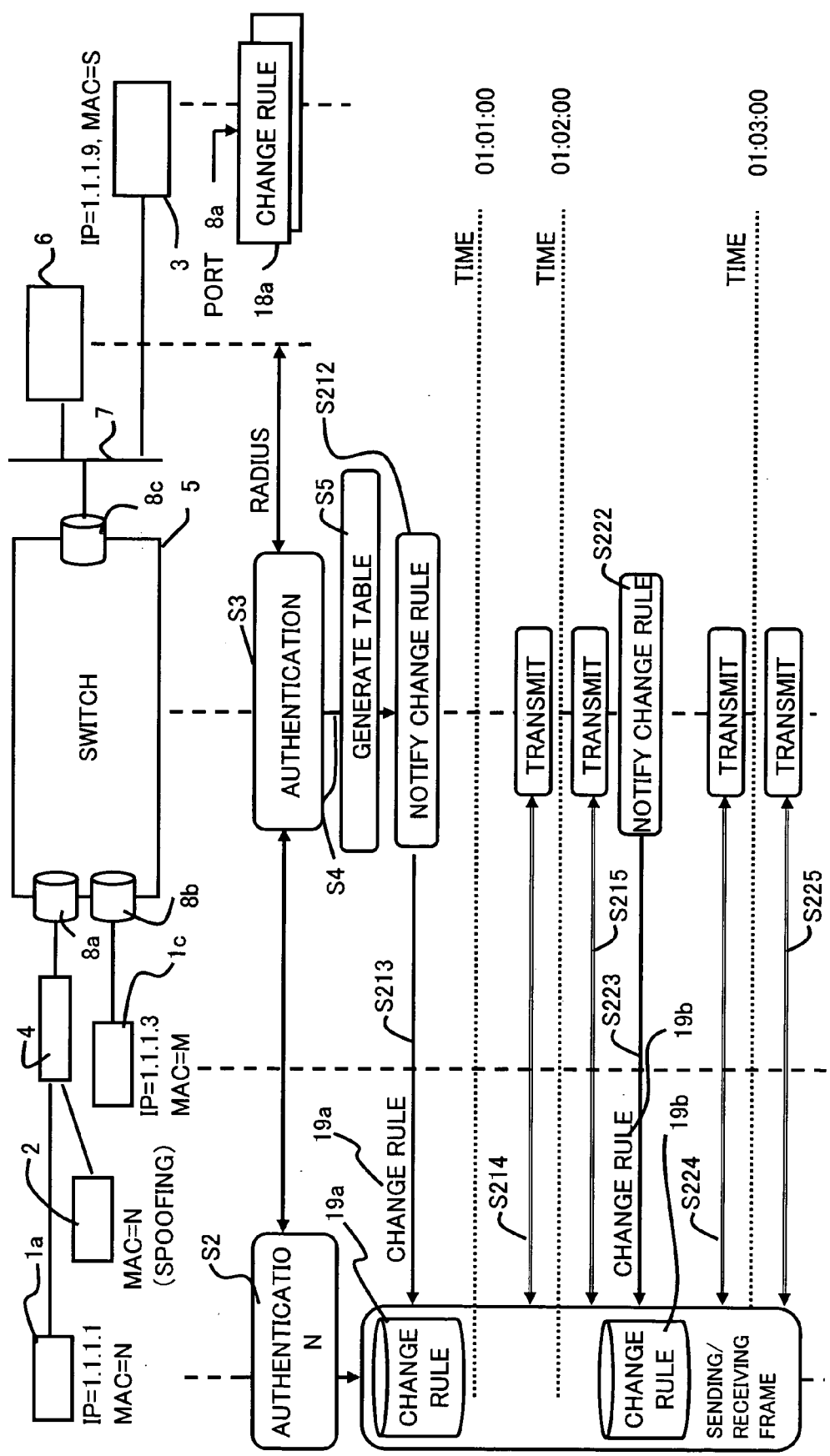
FIG. 9A, FIG. 9B, FIG. 9C, and FIG. 9D constitute a sequence diagram illustrating one example of the operation of change rule notification processing according to the first embodiment.
Figure 9B:
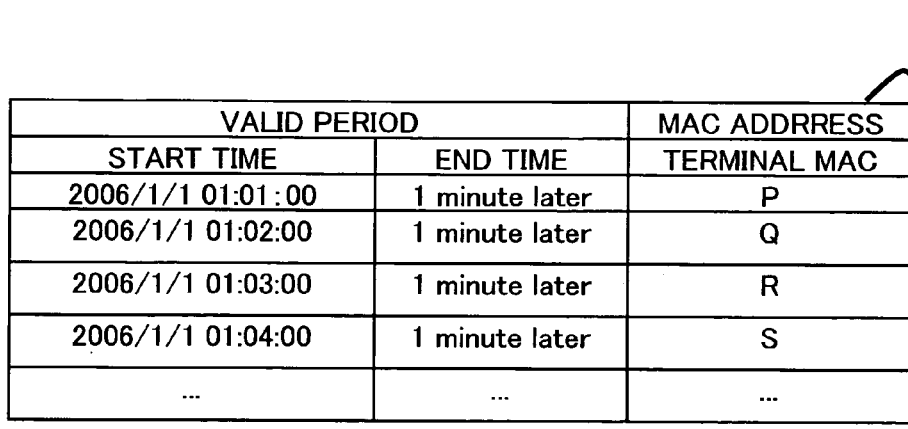
Figure 9C:
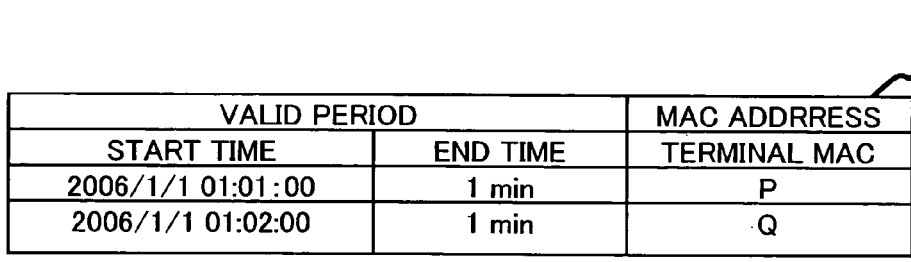
Figure 9D:
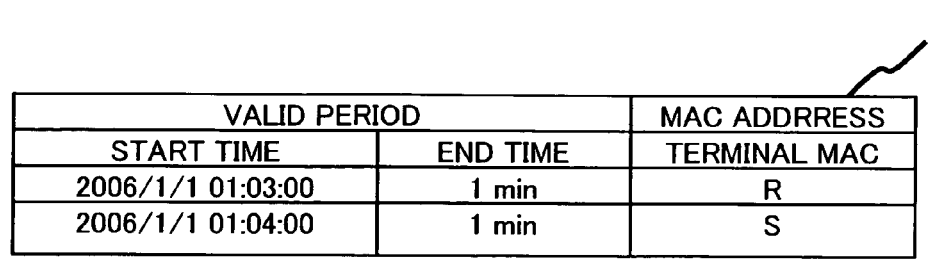

(S6) The change rule notification unit 14 notifies an authenticated terminal (MAC address=N) of a change rule for the port 8a (change rule notification processing). The change rule notification unit 14 may be arbitrary means as long as the means prevent other than the terminal Ia from wiretapping. For example, let us consider an arrangement wherein an encrypted frame is transmitted to the terminal Ia using the key exchanged with EAP-TLS at the time of authentication. FIG. 7 is a screen showing one example of the frame format of an encrypted frame according to the first embodiment. The type of each field in this frame format will be described below.

(a) PAE Ethernet Type: 0x888e (fixed value)
(b) Protocol Version: 1
(c) Packet Type: type of a packet
(d) Packet Body Length: length of Packet Body field (in increments of byte)
(e) Packet Body: data FIG. 8 is a screen showing one example of the packet type of an encrypted frame according to the first embodiment. Here, the value of Packet Type is 0xFF, which indicates the packet to be used with the present example.

Next, description will be made regarding the change rule notification processing in the processing S6.

FIG. 9A, FIG. 9B, FIG. 9C, and FIG. 9D constitute a sequence diagram illustrating one example of the operation of the change rule notification processing according to the first embodiment. The same reference numerals as those in FIG. 4A, FIG. 4B, FIG. 4C, and FIG. 4D represent the same objects or equivalent objects shown in FIG. 4A, FIG. 4B, FIG. 4C, and FIG. 4D, so description thereof will be omitted here. The notification content is rules for the new registrations of the MAC conversion table performed by the table generating unit 17 (two minutes worth in this case).

(S212) Upon the table generating unit 17 generating the change rule 18a equivalent to ten minutes worth in the above-mentioned processing S5, the change rule notification unit 14 transmits a change rule 19a equivalent to the first two minutes worth thereof to the terminal Ia. (S213) The terminal Ia stores the received change rule 19a.

(S214) Next, at the start time (01:01:00) of the first change rule (terminal MAC address P) of the change rule 19a, the terminal Ia and the authentication switch 5 employ the terminal MAC address P as a sending source MAC address for transmission from the terminal Ia to the authentication switch 5, and as a destination MAC address for transmission from the authentication switch 5 to the terminal Ia.

(S215) Similarly, at the start time (01:02:00) of the second change rule of the change rule 19a, a terminal MAC address Q is employed for communication between the terminal Ia and the authentication switch 5.

Next, the change rule notification unit 14 transmits a change rule 19b for the next two minutes worth of the change rule 18a to the terminal Ia until the end time (01:03:00) of the second change rule (S222). The terminal Ia stores the received change rule 19a (S223). In the same way as the processing S213 and S214, at the start time (01:03:00) of the first change rule of the change rule 19b, the terminal Ia and the authentication switch 5 employ a terminal MAC address R for communication between the terminal Ia and the authentication switch 5 (S224), and at the start time (01:04:00) of the second change rule of the change rule 19b, employ the terminal MAC address R for communication between the terminal Ia and the authentication switch 5 (S225).

Note that the notification content may be an arrangement wherein the notification content is divided into each one rule (a pair of a valid period and an MAC address) and the next rule is transmitted before a valid period expires, or may be an arrangement wherein the change rules passed in several steps from the table generating unit 17 are integrated.

(S7) The frame sending/receiving unit 31 of the terminal Ia stores the change rule notified by the above-mentioned processing, and hereafter, performs sending or receiving of a frame while changing to the next MAC address each time a valid period expires in accordance with the change rule thereof. Also, the transfer unit 21 of the authentication switch performs sending or receiving of a frame using the MAC address according to a valid period in accordance with the MAC conversion table 16.

Description will be made below regarding the operation (S8 through S13) of actual communication processing to be performed after the above-mentioned preparation processing. Let us say that the user of the terminal Ia has selected the server 3 as a communication destination using Web access or the like. Also, let us say that the point in time thereof is 01:01:05 Jan. 1, 2006.

(S8) The terminal Ia transmits an ARP request frame arranged to inquire the MAC address corresponding to the IP address 1.1.1.9 of the server 3. The frame sending/receiving unit 31 takes the sending source MAC address P as the inquired MAC address in accordance with the change rule received from the authentication switch 5.

(S9) With the frame received at the authentication switch 5, the receiving port is the port 8a (ON-set), the sending port is the port 8b (ON-set), and the port 8c (OFF-set), the type of frame is an ARP request frame, and also a multiple-addresses frame, and the point in time is 01:01:05 Jan. 1, 2006, so the transfer unit 21 rewrites the sending source MAC address from P to A by later-described transfer processing, and transmits this to the port 8c, and also copies this frame to transmit to the ARP substitute response unit.

Figure 10A:
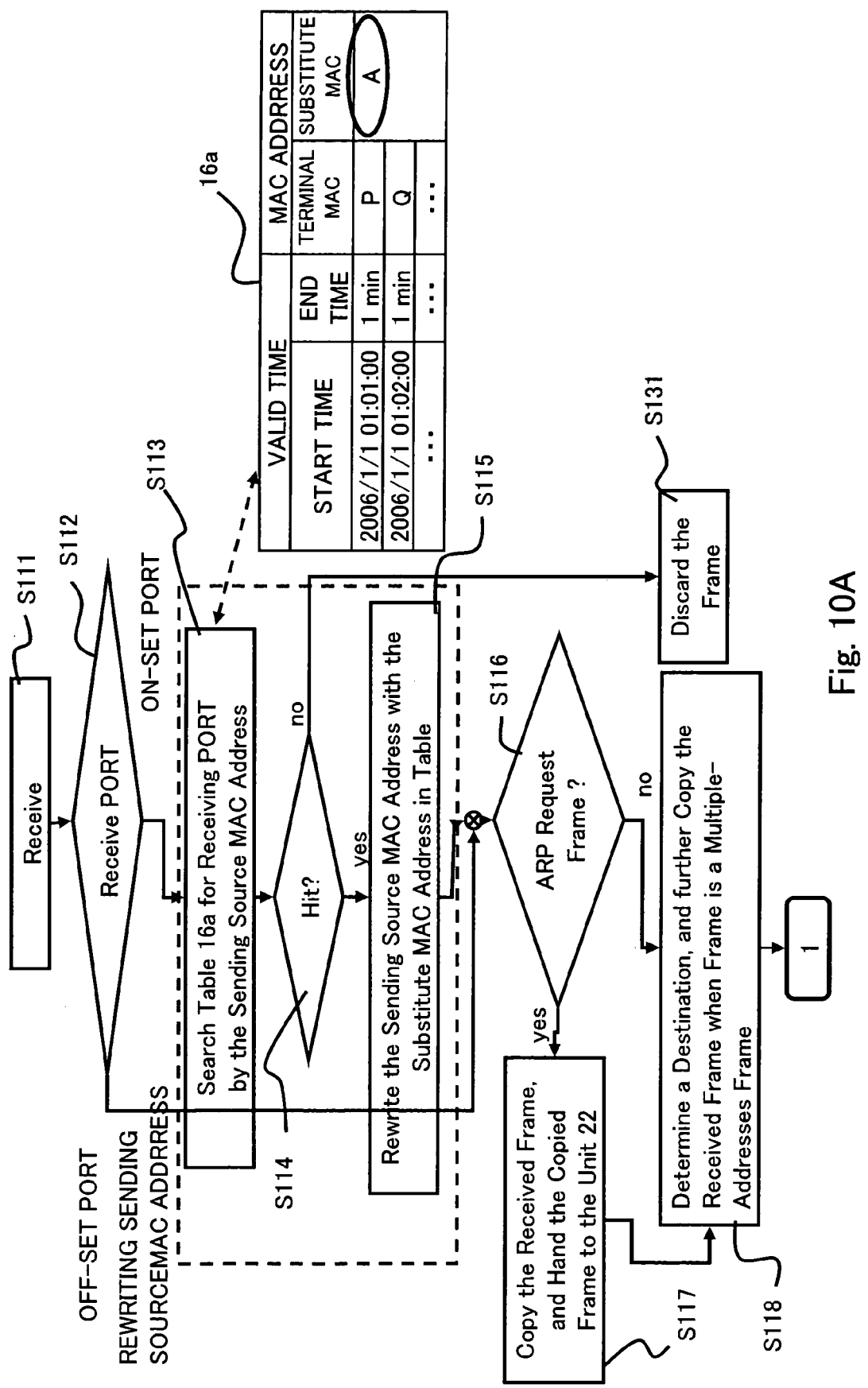
FIG. 10A and FIG. 10B constitute a flowchart illustrating one example of the operation of transfer processing according to the first embodiment.
Figure 10B:
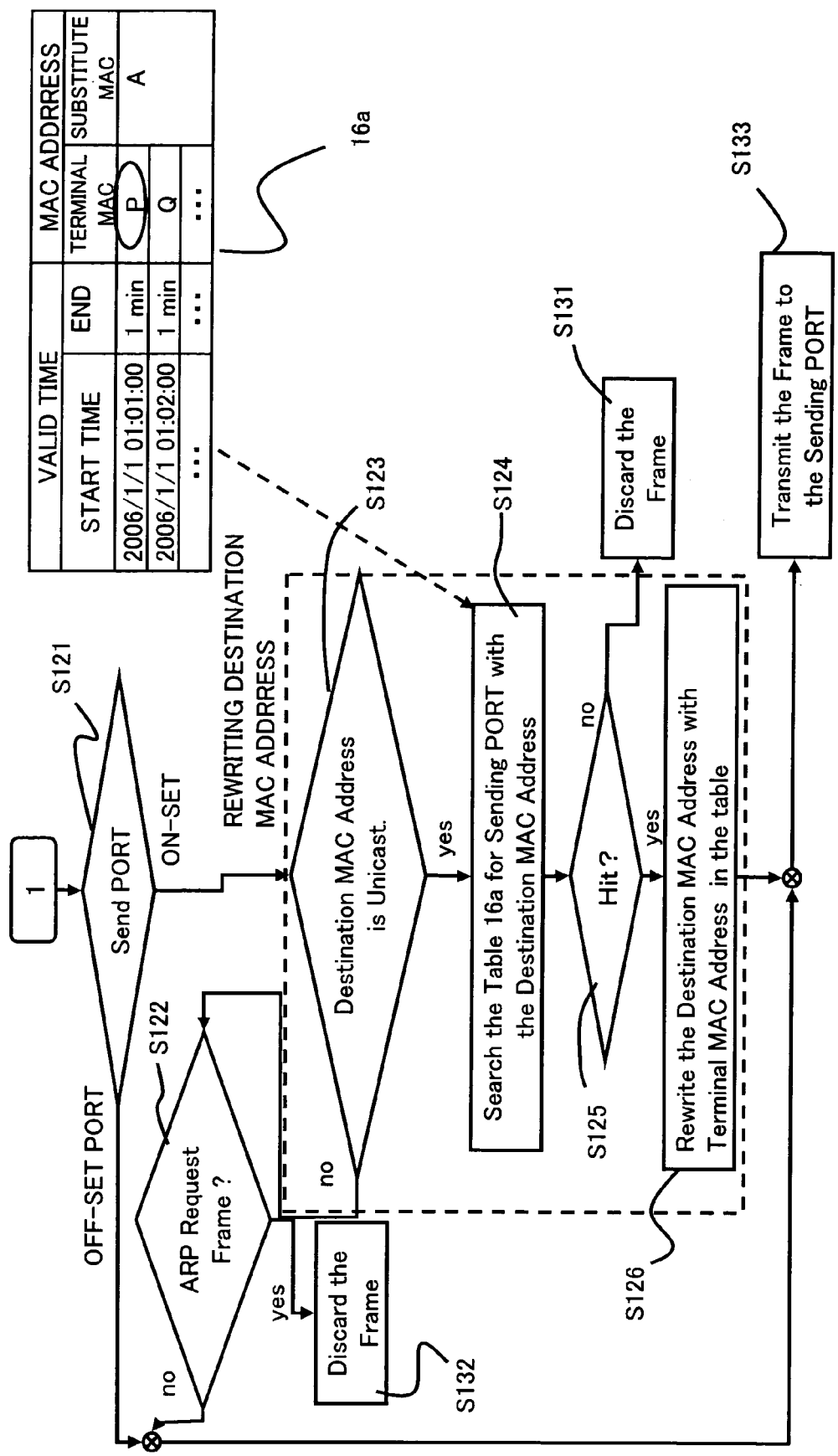

Now, description will be made regarding transfer processing. FIG. 10A and FIG. 10B are a flowchart illustrating one example of the operation of transfer processing according to the first embodiment. First, upon the transfer unit 21 receiving a frame (S111), the transfer unit 21 determines whether the receiving port which received the frame is an ON-set port or OFF-set port (S112). In the event of an OFF-set port (S112, OFF-set), the flow proceeds to processing 5116. In the event of an ON-set port (S112, ON-set), the transfer unit 21 searches the MAC conversion table 16a for receiving port with a valid period (e.g., in the event that the received point-in-time is 01:01:05 Jan. 1, 2006, the start time is 01:01:xx Jan. 1, 2006) and the sending source MAC address (S113), and determines whether or not the sending source MAC address (terminal MAC address) P has been hit (S114).

In the event that the sending source MAC address (terminal MAC address) P has not been hit (S114, NO), the transfer unit 21 discards the frame (S131), and ends this flow. In the event that the sending source MAC address (terminal MAC address) P has been hit (S114, YES), the transfer unit 21 rewrites the sending source MAC address P with the substitute MAC address A in accordance with the MAC conversion table (S115). Next, the transfer unit 21 determines whether or not the received frame is an ARP request frame (5116). In the event that the received frame is not an ARP request frame (S116, NO), the flow proceeds to processing 5118. In the event of an ARP request frame (S116, YES), the transfer unit 21 copies the received frame as a copied frame, and hands the copied frame to the ARP substitute response unit 22 (S117). Next, the transfer unit 21 determines a destination, and in the event of a multiple-addresses frame, further copies the received frame (S118).

Next, the transfer unit 21 determines whether the sending port configured to send the received frame is an ON-set or OFF-set port (S121). In the event of an OFF-set port (S121, OFF-set), the transfer unit 21 transmits the frame to the sending port (S133), and ends this flow. In the event of an ON-set port (S121, ON-set), the transfer unit 21 determines whether or not the destination MAC address is Unicast (S123). In the event that the destination MAC address is not Unicast (S123, NO), the transfer unit 21 determines whether or not the received frame is an ARP request frame (S122). In the event of an ARP request frame (S122, YES), the transfer unit 21 discards the frame (S132), and ends this flow. In the event of not an ARP request frame (S122, NO), the flow proceeds to processing S133.

In the event of Unicast in the processing S123 (S123, YES), the transfer unit 21 searches the MAC conversion table 16*a* for sending port with a valid period (e.g., in the event that the received point-in-time is 01:01:05 Jan. 1, 2006, the start time is 01:01:xx, Jan. 1, 2006) and the destination MAC address (substitute MAC address) A (S124), and determines whether or not the destination MAC address A has been hit (S125). In the event that the destination MAC address A has not been hit (S125, NO), the flow proceeds to processing S131. In the event that the destination MAC address A has been hit (S125, YES), the transfer unit 21 rewrites the destination MAC address A with the corresponding terminal MAC address P in accordance with the MAC address conversion table (S126), and the flow proceeds to processing 5133.

(S10) The ARP substitute response unit 22 performs the same operation as the existing Proxy-ARP process. That is to say, the ARP substitute response unit 22 searches the ARP table 23 with IP address 1.1.1.9, which has failed to hit, and ends the processing at that time.

(S11) Of the apparatuses which received an ARP request frame, the server 3 is IP=1.1.1.9, so transmits an ARP response frame as the destination MAC address A. Now, let us say that the server 3 transmits the frame to the authentication switch 5 one second later after receiving the ARP response frame.

(S12) With the frame received at the authentication switch 5, the receiving port is the port 8*c* (OFF-set), the sending port is the port 8*a* (ON-set), the type of frame is a frame other than an ARP request frame, which is a Unicast frame, and the point in time is 01:01:06 Jan. 1, 2006, so the transfer unit 21 rewrites the destination address from A to P to transmit the frame to the port 8*a* based on the transfer processing. Now, let us say that the authentication switch 5 has transmitted the frame to the terminal Ia one second later after receiving the ARP response frame.

(S13) The point in time is 01:01:07 Jan. 1, 2006, so therefore the frame sending/receiving unit 31 of the terminal Ia receives the frame of the destination MAC address P in accordance with a change rule. According to the above-mentioned operation, the terminal Ia can communicate with the server 3 on the same LAN.

Note that with the present embodiment, there is a possibility before and after expiration of the valid period of an MAC address that the effective terminal MAC address might change between the sending side apparatus and the receiving side apparatus due to the subtle mismatching of time synchronization between the apparatuses, processing delay, or the like. For example, there is a case wherein the authentication switch 5 transmitted the frame at 01:01:59 Jan. 1, 2006 with the destination MAC address P, but the terminal Ia received the frame at 01:02:00 Jan. 1, 2006, so the terminal MAC address was changed to Q. In preparation for such a case, it is desirable before and after change of the MAC address (e.g., five seconds earlier and five seconds later) for the terminal Ia and the authentication switch 5 to be able to receive either of the addresses before and after change. Alternatively, in the event that the interval between certain change time and another change time is short, an arrangement may be made wherein each apparatus transmits a frame with the MAC address after change in a sure manner by delaying transmission for a moment.

Next, description will be made regarding the case B.

Figure 11A:
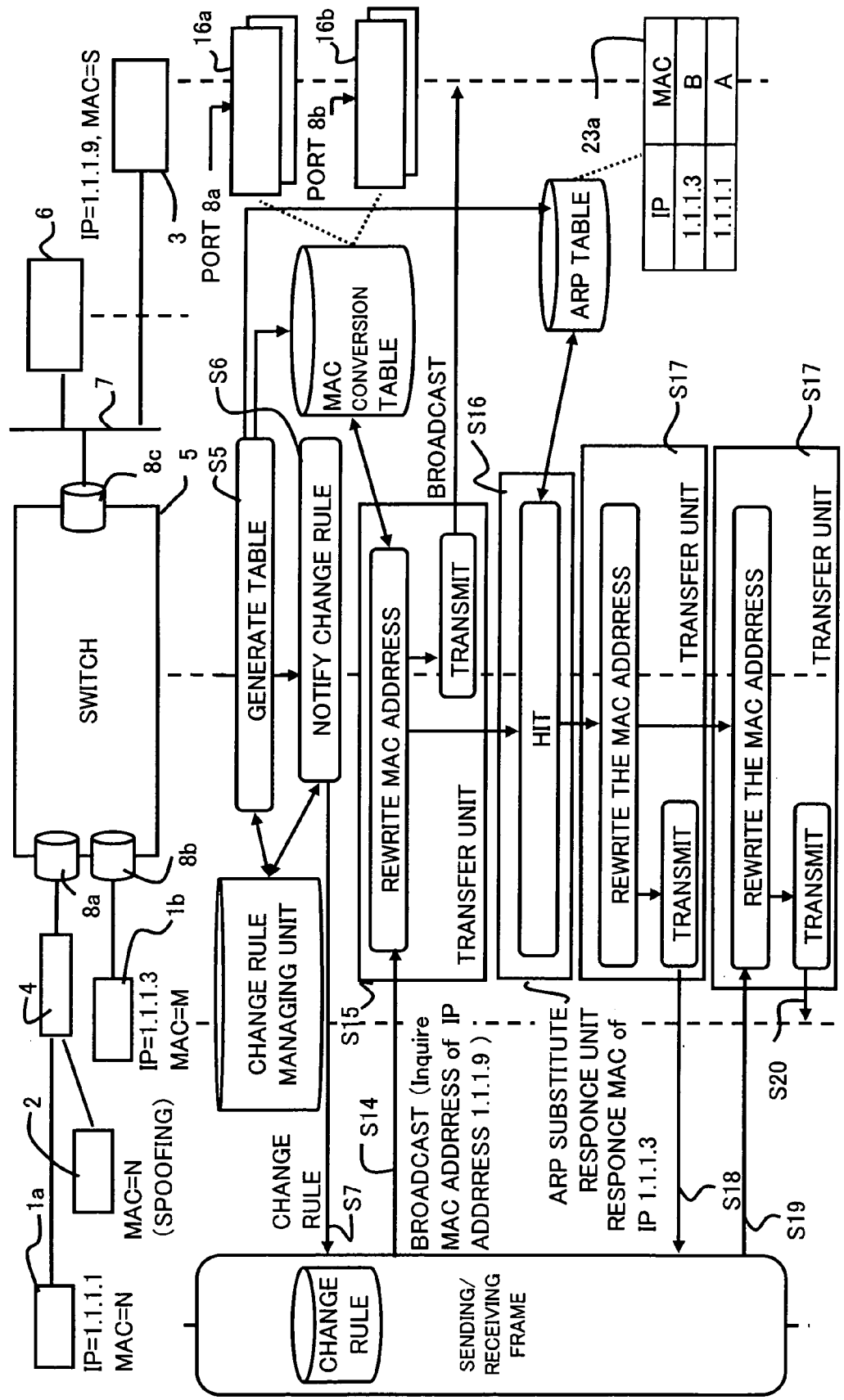

FIG. 11A, FIG. 11B, and FIG. 11C constitute a sequence diagram illustrating one example of the operation in the case B of the communication system according to the first embodiment. In this drawing, the same reference numerals as those in FIG. 4A, FIG. 4B, FIG. 4C, and FIG. 4D represent the same objects or equivalent objects shown in FIG. 4A, FIG. 4B, FIG. 4C, and FIG. 4D, so description thereof will be omitted here. The case B is a case wherein the authorized terminal Ia performs communication with another authorized terminal Ib on the authentication switch 5. This drawing illustrates the operations of the terminals 1*a* and Ib (MAC address unique to the apparatus=M, IP address=1.1.1.3), authentication switch 5, RADIUS server 6, and sever 3. Here, the terminal Ib and the terminal 1 are equivalent. The preparation processing is the same as that in the case A. Now, let us say that the terminal Ib has been authenticated. Also, let us say that the MAC conversion table 16*a* for the port 8*a*, and the MAC conversion table 16*b* for the port 8*b* have been generated by the preparation processing.

Description will be made below regarding the operation (S14 through S20) of actual communication processing to be performed after the above-mentioned preparation processing.

First, let us say that the user of the terminal Ia has selected the terminal Ib as a communication destination using Web access or the like. Also, let us say that point in time thereof is 01:01:05 Jan. 1, 2006.

(S14) The terminal Ia transmits an ARP request frame arranged to inquire the MAC address corresponding to the IP address 1.1.1.3 of the terminal Ib. Let us say that the sending destination MAC address is set to P in accordance with the above-mentioned change rule.

(S15) The authentication switch 5 rewrites, as with the processing S9, the sending source MAC address from P to A using the MAC conversion table 16*a*, and transmits this to the port 8*c*, and also copies an ARP request frame to transmit to the ARP substitute response unit 22.

(S16) The ARP substitute response unit 22 performs the same operation as the existing Proxy-ARP process. Here, the ARP substitute response unit 22 searches the ARP table 23*a* with an IP address of 1.1.1.3, and hits the ARP table 23*a*, which is different from the case A, so generates a response to effect that the MAC address is B, addressed to the sending source of the ARP request frame. That is to say, the ARP substitute response unit 22 generates an ARP response frame addressed to the MAC address A. Now, let us say that the server 3 has transmitted the ARP response frame to the authentication switch 5 one second later after receiving the ARP response frame.

(S17) With the frame received at the authentication switch 5, the sending port is the port 8a (ON-set), the type of frame is a frame other than an ARP request frame, which is a Unicast frame, and the point in time is 01:01:06 Jan. 1, 2006, so the transfer unit 21 rewrites the destination address from A to P to transmit to the port 8a based on the transfer processing. Now, let us say that the authentication switch 5 has transmitted the ARP response frame to the terminal Ia one second later after receiving the ARP response frame.

(S18) The point in time is 01:01:07 Jan. 1, 2006, so the terminal Ia receives the ARP response frame addressed to the MAC address P.

(S19) The terminal Ia obtains the MAC address of the terminal Ib from the ARP response, and transmits a frame with the sending source MAC address=P, and the destination MAC address=B. Let us say that the point in time is 01:01:15 Jan. 1, 2006.

(S20) According to the transfer processing using the MAC address conversion tables 16a and 16b, the authentication switch 5 rewrites the sending source MAC address from P to A, and the destination MAC address from B to X respectively to transmit to the port 8b.

According to the above-mentioned operation, the terminal Ia can communicate with another terminal Ib on the same authentication switch 5.

Next, description will be made regarding the case C.

Figure 12A:
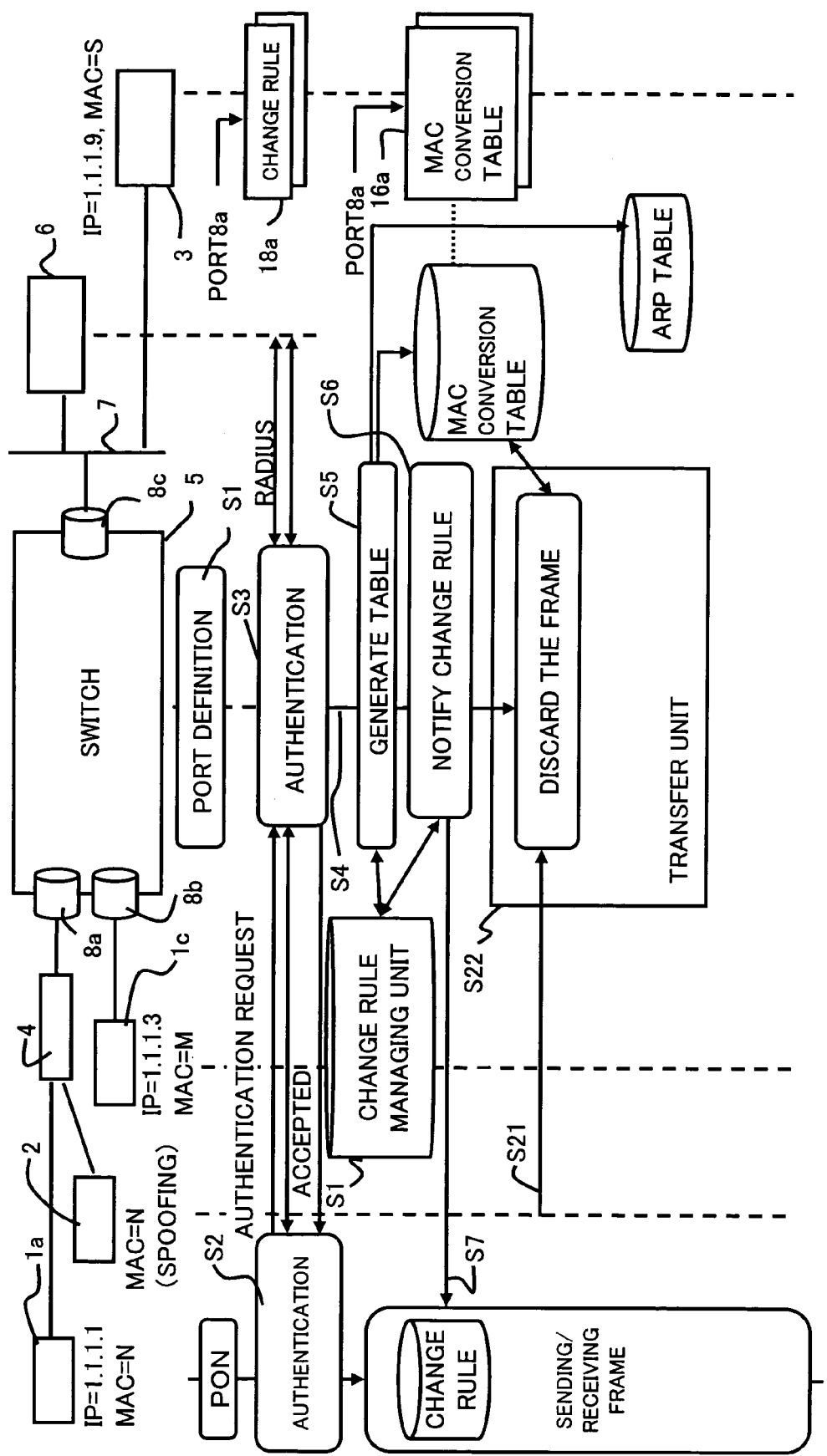
FIG. 12A, FIG. 12B, and FIG. 12C constitute a sequence diagram illustrating one example of the operation of MAC address conversion processing in a case C of a communication system according to the first embodiment.
Figure 12B:
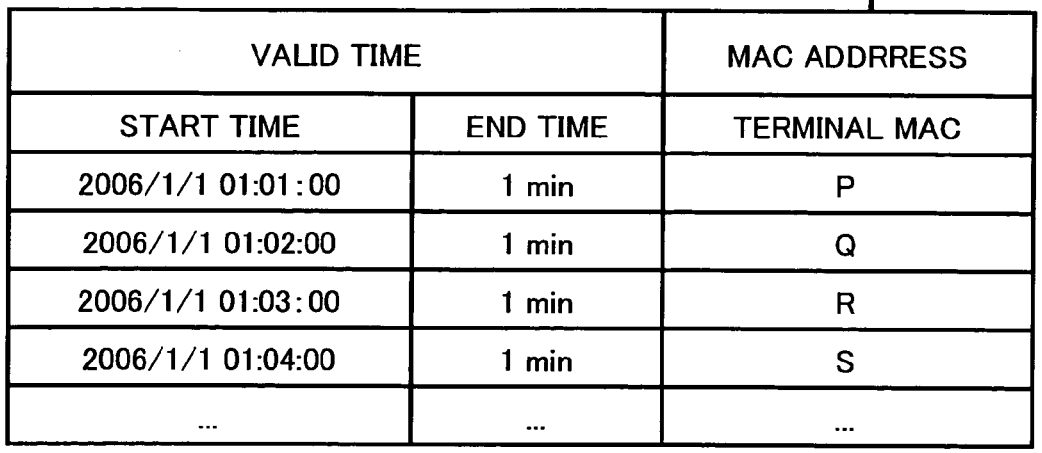
Figure 12C:
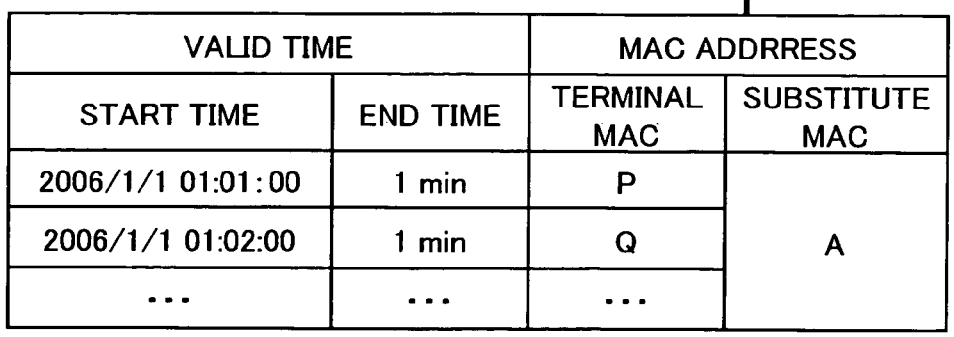
Figure 13A:
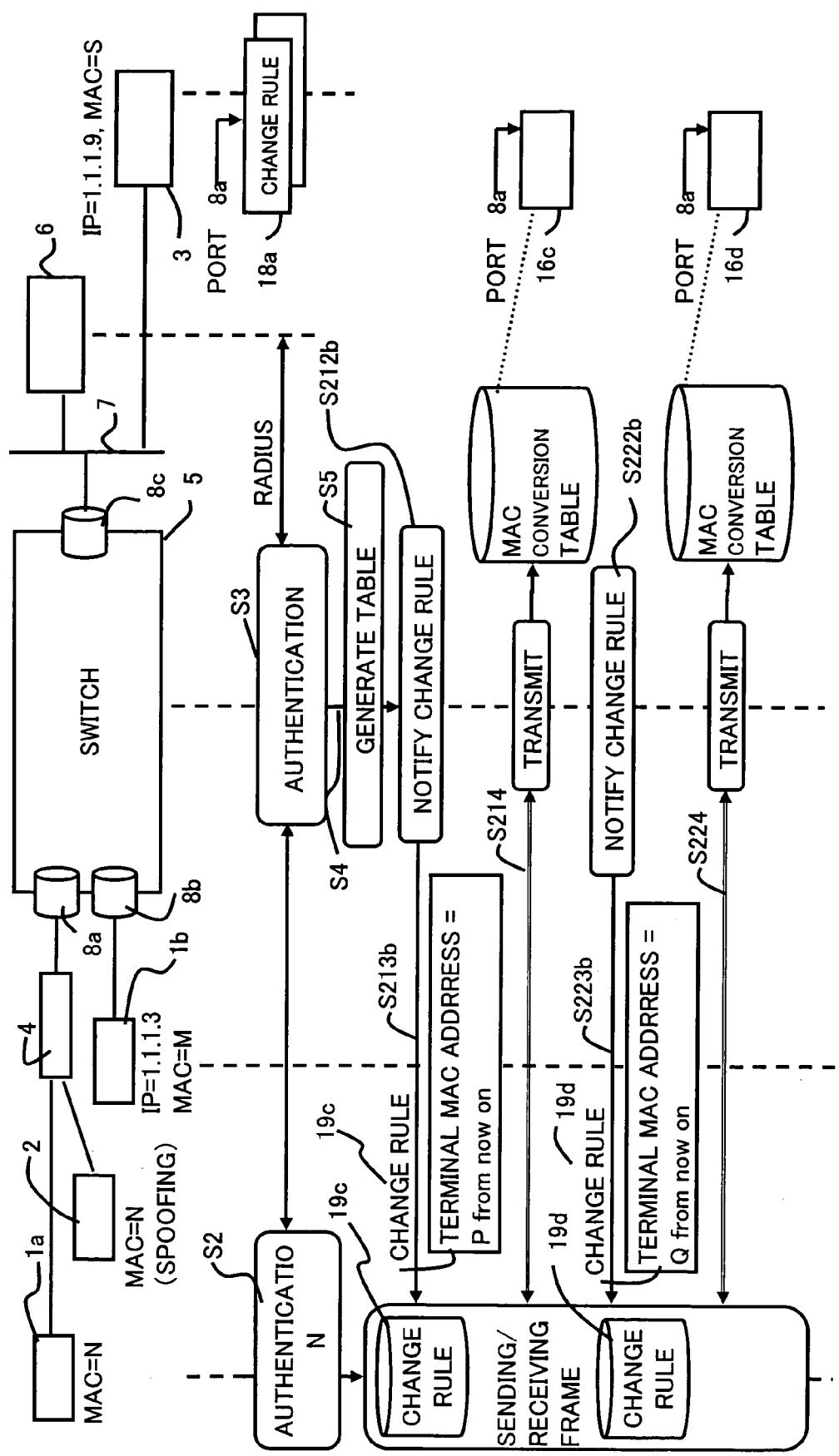

FIG. 12A, FIG. 12B, and FIG. 12C constitute a sequence diagram illustrating one example of the operation of MAC address conversion processing in the case C of the communication system according to the first embodiment. The same reference numerals as those in FIG. 4A, FIG. 4B, FIG. 4C, and FIG. 4D represent the same objects or equivalent objects shown in FIG. 4A, FIG. 4B, FIG. 4C, and FIG. 4D, so description thereof will be omitted here. The case C is a case wherein a terminal 2 which fakes the MAC address=N possessed by the NIC of the authorized terminal Ia attempts to communicate with the server 3. This drawing illustrates the operations of the terminals 2, and authentication switch 5. The terminal 2 is an unauthorized terminal (terminal faking its MAC address with the terminal Ia). Let us say that a malicious user disposes a repeater 4 under the port 8a, and then connects the unauthorized terminal for the purpose of faking the terminal Ia.

(S21) Let us say that the point in time is 01:01:05 Jan. 1, 2006. The terminal 2 transmits an ARP request frame arranged to inquire the MAC address corresponding to the IP address of 1.1.1.9 of the server 3. Here, the terminal 2 does not know the change rule notified to the terminal Ia, and so sets the sending source MAC address=N.

(S22) With the frame received at the authentication switch 5, the receiving port is the port 8a (ON-set port), and the point in time is 01:01:05 Jan. 1, 2006, so the transfer unit 21 discards the frame based on the transfer processing.

According to the above-mentioned operation, the frame transmitted from the unauthorized terminal 2 fails to pass through the authentication switch 5.

Next, let us say that the unauthorized terminal 2 has obtained the MAC address P assigned to the terminal Ia by wiretapping of frames or the like, and has faked the MAC address P at the point in time of 01:01:05 Jan. 1, 2006.

First, the terminal 2, as with the processing S8, transmits an ARP request frame arranged to inquire the MAC address corresponding to the IP address of 1.1.1.9 of the server 3. Let us say that the sending source MAC address is P.

With the frame received at the authentication switch 5, the receiving port is the port 8a (ON-set), and the point in time is 01:01:05 Jan. 1, 2006, so as with the processing S9 through S13, the terminal 2 can communicate with the server 3 normally.

Let us say that one minute has elapsed after that, and the terminal 2 has attempted communication with the same sending source MAC address=P. In this case, with the authentication switch, the receiving port of the frame thereof is the port 8a (ON-set), and the point in time thereof is 01:02:05 Jan. 1, 2006, so the transfer unit 21, as with the processing S22, discards the frame based on the transfer processing.

In the event that discarding of a frame is frequently performed, there is a high possibility that faking is being performed, so hereafter, the valid period may be shortened autonomously.

According to the above-mentioned operation, even if the unauthorized terminal 2 obtains the MAC address of an authorized terminal at a certain moment and fakes the MAC address of the terminal, upon the valid period of the MAC address thereof expiring, the unauthorized terminal 2 fails to achieve network access.

According to the present embodiment, the authorized terminals Ia and Ib send or receive a frame using the frame sending/receiving unit 31 while changing the MAC address of the sending/receiving frame every moment in accordance with the change rule received from the change rule notification unit. The authentication switch 5 uses the transfer unit 21 to determine whether to permit the received frame to be transferred depending on whether the sending source MAC address of the received frame is registered in the MAC conversion table, and in the event of prohibiting transfer, discards the frame. According to this operation, even if an unauthorized user obtains the MAC address of an authorized terminal to fake the MAC address of the terminal, upon the valid period of the MAC address expiring, the unauthorized user fails to achieve network access. Also, conventionally, in order to prevent MAC faking, the whole frame has been encrypted, but according to the present invention, the authentication switch 5 can recognize and prevent MAC faking with only an MAC address, whereby the processing load regarding encryption and addition/deletion of a header can be markedly reduced with the authentication switch.

Also, with a technique such as Japanese Unexamined Patent Application Publication No. 2002-111544, a terminal MAC address is a value unique to the NIC of a terminal, so there is the need to further perform encryption of frames, but with the present embodiment, a terminal MAC address is dynamically changed, so there is no need to perform encryption of frames.

Also, according to the present embodiment, the authentication switch 5 uses the transfer unit 21 to convert the terminal MAC address within a received frame from an ON-set port into a substitute MAC address, and also to subject a sending frame toward an ON-set port to inverse conversion, and further uses the ARP substitute response unit 22 to respond with the substitute MAC address regarding an ARP request from another terminal as to an authorized terminal. According to this operation, an authorized terminal of which the MAC address changes every moment can communicate with another node within a LAN.

Second Embodiment

With the present embodiment, assuming a case wherein the terminal 1 and the authentication switch 5 according to the first embodiment do not perform time synchronization, description will be made regarding an arrangement wherein the authentication switch 5 issues an instruction of change timing of the terminal MAC address to the terminal 1.

The configuration of a communication system according to the present embodiment is the same as that in the first embodiment, but the authentication switch 5 according to the present embodiment does not need the point-in-time synchronizing unit 24 according to the first embodiment. Also, the terminal 1 according to the present embodiment does not need the point-in-time synchronizing unit 34 according to the first embodiment.

The operation of the communication system according to the present embodiment is the same as that in the first embodiment, but the change rule notification processing differs from that in the first embodiment. FIG. 13A, FIG. 13B, FIG. 13C, and FIG. 13D constitute a sequence diagram illustrating one example of the operation of the change rule notification processing according to the second embodiment. The same reference numerals as those in FIG. 9A, FIG. 9B, FIG. 9C, and FIG. 9D represent the same objects or equivalent objects shown in FIG. 9A, FIG. 9B, FIG. 9C, and FIG. 9D, so description thereof will be omitted here. When compared with the first embodiment, processing S212b is executed instead of the processing S212, processing S213b is executed instead of the processing S213, processing S222b is executed instead of the processing 5222, and processing S223b is executed instead of the processing 5223. With MAC conversion tables 16c and 16d, "Prey" represents the valid period of the terminal MAC address used immediately before, "Now" represents the valid period of the terminal MAC address currently being used, and "Next" represents the valid period of the terminal MAC address to be used next.

(S212b, S222b) Upon detecting the expiration of the valid period of an MAC address based on the point in time and change rule within the authentication switch 5, the change rule notification unit 14 notifies the authenticated terminal Ia (MAC address=N) of a change rule as to the port 8a. The change rule is held by the change rule management unit 13. The change rule notification unit 14 may be arbitrary means as long as the means prevent other than the terminal Ia from wiretapping. The notification content is a change rule 19c (i.e., a terminal MAC address to be used by the terminal Ia from now on), and further, reception itself of a change rule becomes the trigger of change of the MAC address for the terminal Ia.

(S213b, S223b) The frame sending/receiving unit 31 of the terminal Ia stores the change rule wherein the above-mentioned notice is received. Subsequently, the frame sending/receiving unit 31 of the terminal Ia performs sending or receiving of a frame with the notified terminal MAC address in accordance with the change rule thereof until the next notification is received. Also, the transfer unit 21 of the authentication switch 5 performs sending or receiving of a frame with the notified MAC address until the next notification is performed.

Note that as with the first embodiment, it is desirable before and after change of the MAC address (e.g., five seconds earlier and five seconds later) for the terminals Ia and Ib and the authentication switch 5 to be able to receive either of the addresses before and after change.

According to the present embodiment, with the terminal 1 and the authentication switch 5, there is no need to perform time synchronization.

Third Embodiment

With the present embodiment, description will be made regarding an arrangement wherein the authenticated terminal 1 applies a request (trigger) of change to the authentication switch 5 and obtains a notice from the authentication switch 5 rather than the authentication switch 5 applying a trigger of change of the terminal MAC address such as the second embodiment.

Figure 14:
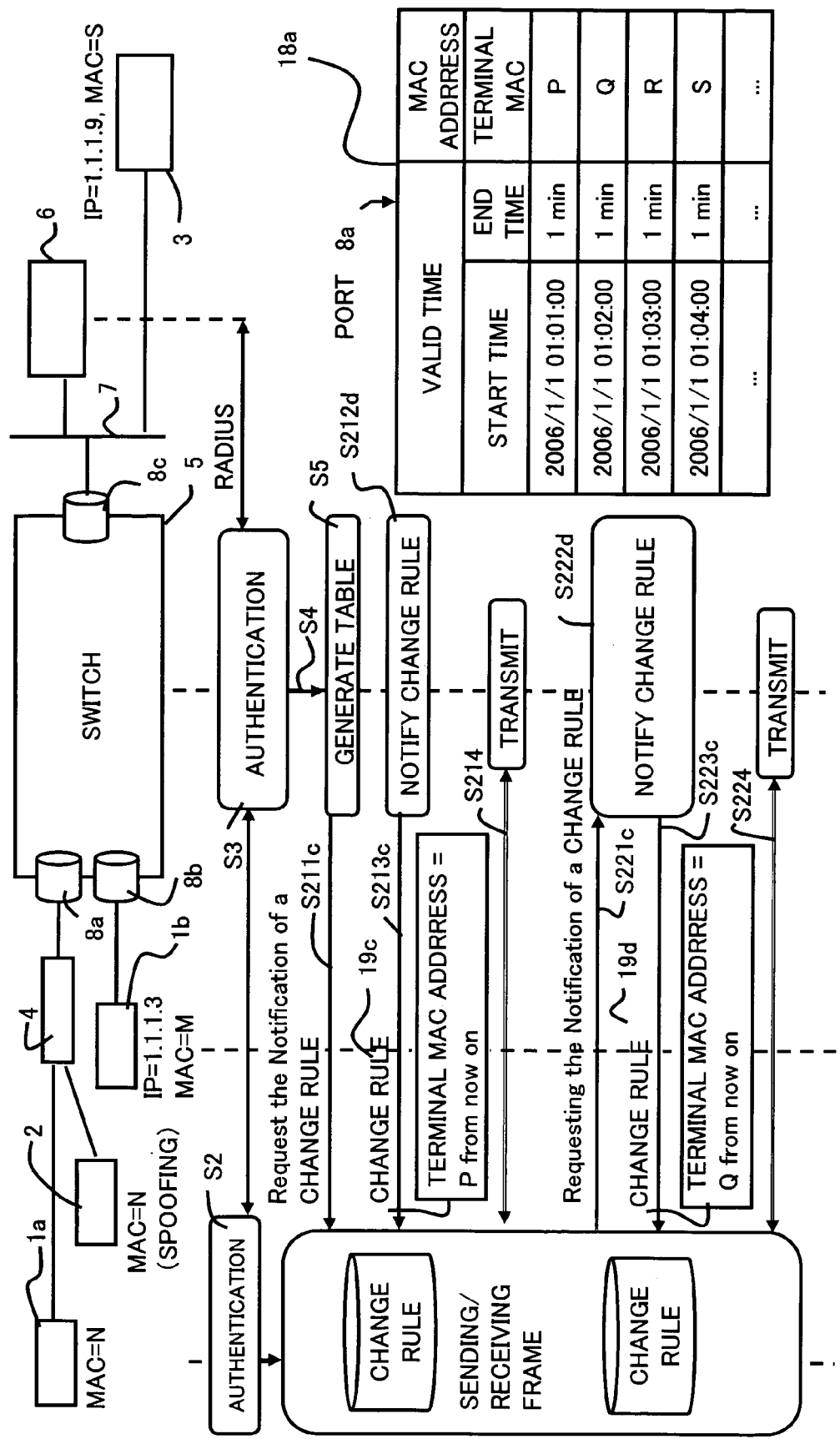
FIG. 14 is a sequence diagram illustrating one example of the operation of change rule notification processing according to a third embodiment.

The configuration of the communication system according to the present embodiment is the same as that in the second embodiment, but the change rule notification processing differs from that in the second embodiment. FIG. 14 is a sequence diagram illustrating one example of the operation of the change rule notification processing according to the third embodiment. The same reference numerals as those in FIG. 13A, FIG. 13B, FIG. 13C, and FIG. 13D represent the same objects or equivalent objects shown in FIG. 13A, FIG. 13B, FIG. 13C, and FIG. 13D, so description thereof will be omitted here. When compared with the second embodiment, processing S211c and S213c are executed instead of the processing S212b, and processing S221c and S223c are executed instead of the processing S222b.

(S211c, S221c) Upon detecting that the expiration of the valid period of an MAC address is approaching based on the point in time and change rule within the terminal Ia, the frame sending/receiving unit 31 on the terminal Ia of which the authentication has been completed requests the authentication switch 5 of the notification of a change rule. A request interval may be set on the UI by the user, or may be set by the frame sending/receiving unit 31 automatically.

(S213c, S223c) The change rule notification unit 14 on the authentication switch 5, which has received the request, notifies the authenticated terminal Ia (MAC address=N) of a change rule for the port 8a. The operation thereafter is the same as that in the second embodiment.

According to the present embodiment, with the authentication switch 5, there is no need to manage the sending timing of a change rule.

Fourth Embodiment

With the present embodiment, assuming a case wherein time synchronization is not performed in the first embodiment, description will be made regarding an arrangement wherein the valid period of a terminal MAC address is sectioned with the number of sending/receiving frames of the terminal 1 and the authentication switch 5.

First, description will be made regarding a communication system according to the present embodiment.

Figure 15:
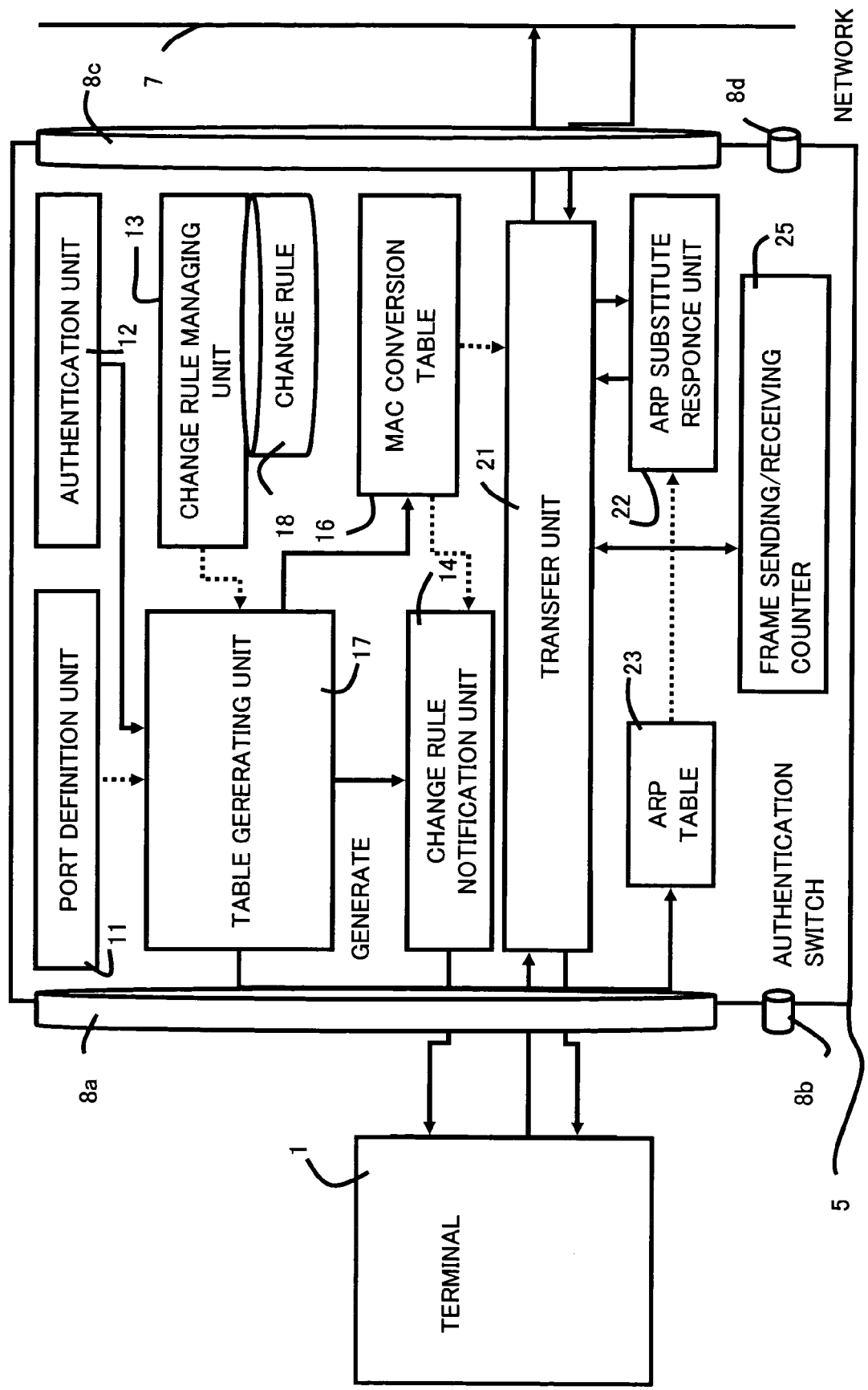
FIG. 15 is a block diagram illustrating one example of the configuration of an authentication switch according to a fourth embodiment.

FIG. 15 is a block diagram illustrating one example of the configuration of an authentication switch according to the fourth embodiment. The same reference numerals as those in FIG. 1 represent the same objects or equivalent objects shown in FIG. 1, so description thereof will be omitted here. When compared with the first embodiment, the authentication switch 5 includes a frame sending/receiving counter 25 instead of the point-in-time synchronizing unit 24. The frame sending/receiving counter 25 counts frames received by the transfer unit 21 for each port.

Figure 16:
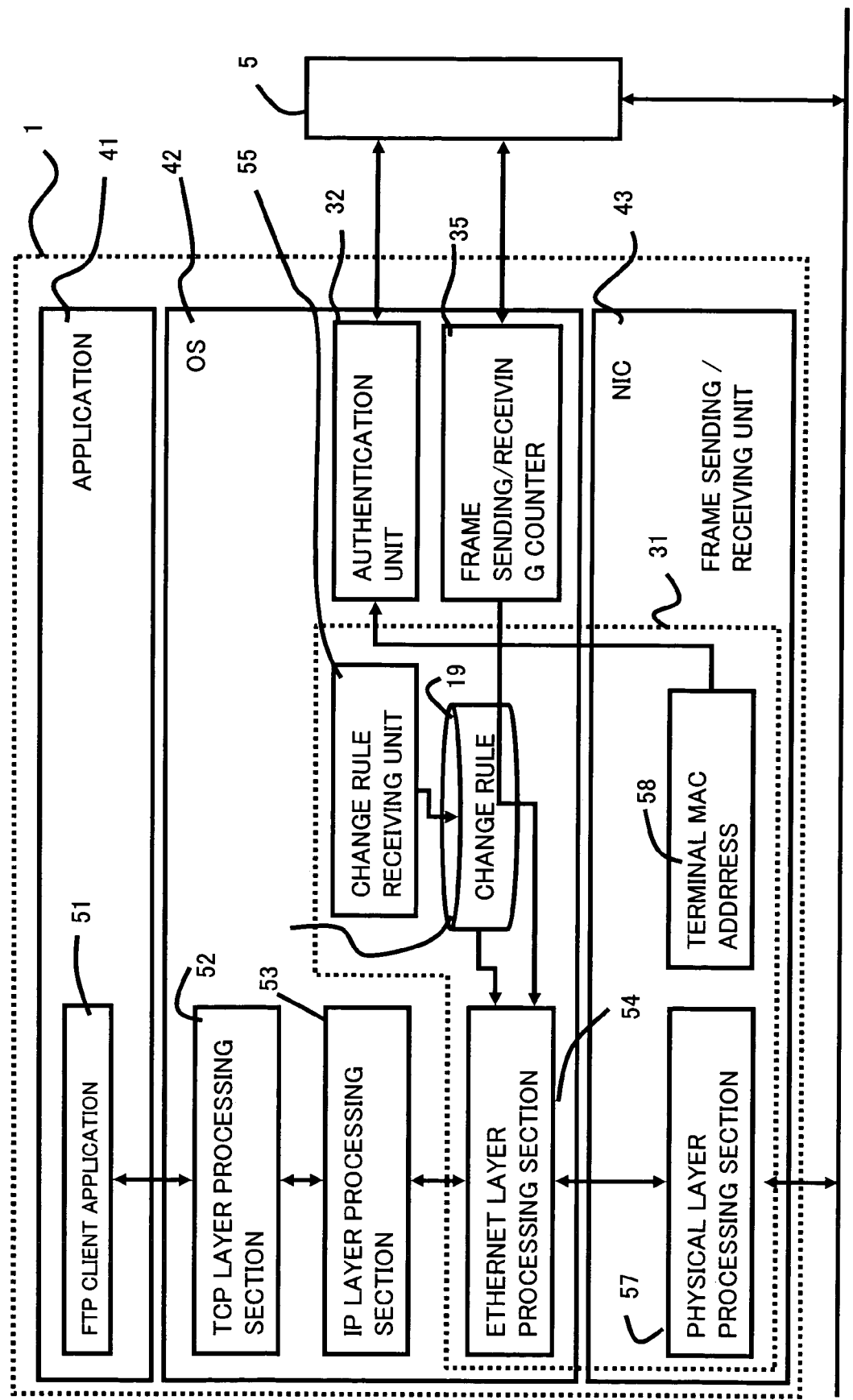
FIG. 16 is a block diagram illustrating one example of the configuration of a terminal according to the fourth embodiment.
Figure 18A:
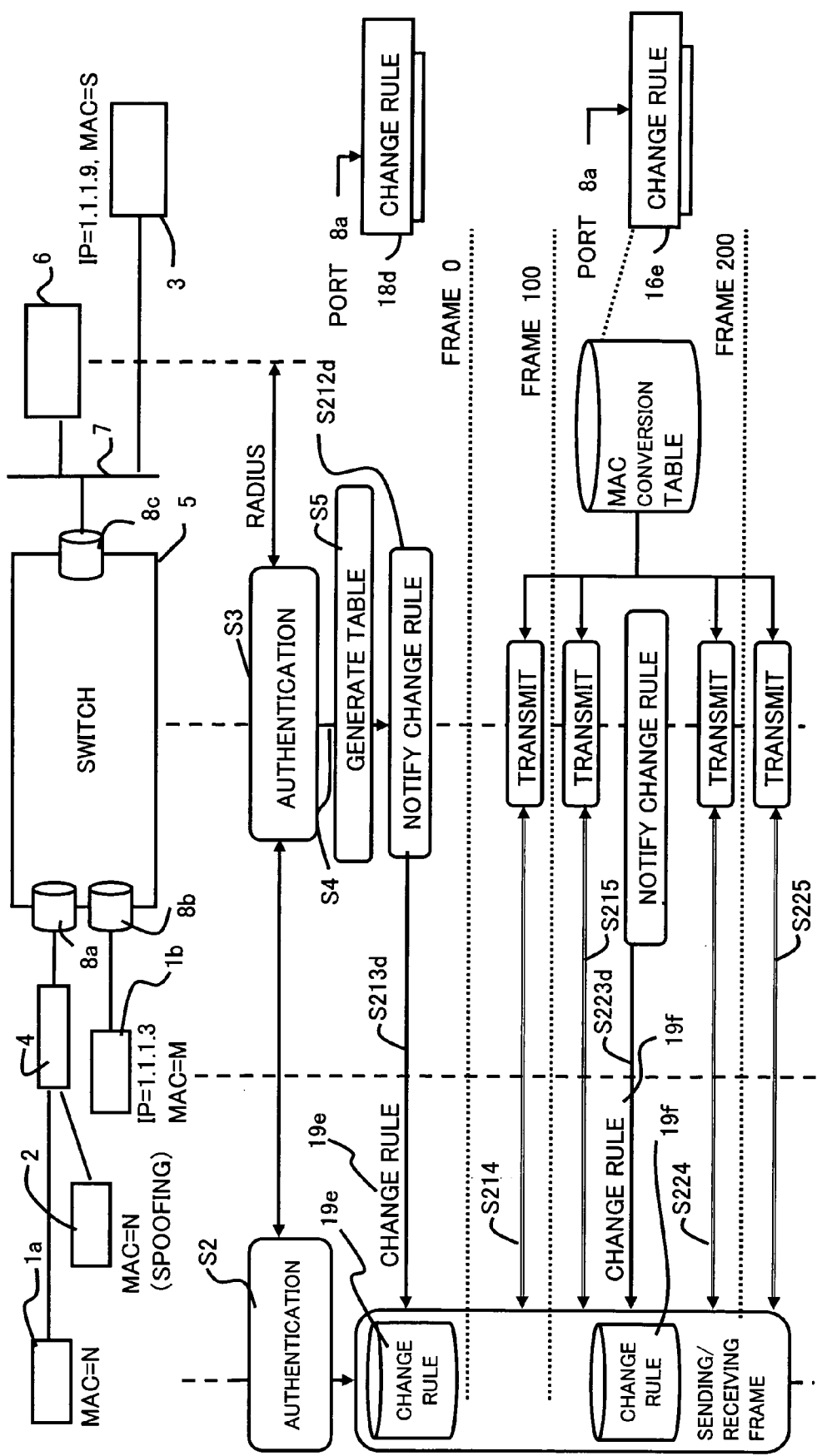

FIG. 16 is a block diagram illustrating one example of the configuration of a terminal according to the fourth embodiment. The same reference numerals as those in FIG. 2 represent the same objects or equivalent objects shown in FIG. 2, so description thereof will be omitted here. When compared with the first embodiment, the terminal 1 includes a frame sending/receiving counter 35 instead of the point in-time synchronizing unit 34. The frame sending/receiving counter 35 counts frames received by the frame sending/receiving unit 31.

FIG. 17A, FIG. 17B, and FIG. 17C are a screen illustrating one example of setting UIs according to the fourth embodiment. In this drawing, the port setting UI, and the substitute MAC address setting UI are the same as those in the first embodiment, but the valid period in the MAC address valid period setting UI is represented with the number of frames.

Next, description will be made regarding the operation of the communication system according to the present embodiment.

The operation of the communication system according to the present embodiment is the same as that in the first embodiment, but the change rule notification processing differs from that in the first embodiment. FIG. 18A, FIG. 18B, FIG. 18C, FIG. 18D, and FIG. 18E constitute a sequence diagram illustrating one example of the operation of the change rule notification processing according to the fourth embodiment. The same reference numerals as those in FIG. 9A, FIG. 9B, FIG. 9C, and FIG. 9D represent the same objects or equivalent objects shown in FIG. 9A, FIG. 9B, FIG. 9C, and FIG. 9D, so description thereof will be omitted here. When compared with the first embodiment, processing S212d is executed instead of the processing S212, processing S213d is executed instead of the processing S213, processing S222d is executed instead of the processing 5222, and processing S223d is executed instead of the processing S223.

(S212d, S222d) The change rule notification unit 14 notifies the authenticated terminal Ia (MAC address=N) of a change rule for the port 8a. The change rule is held by the change rule management unit 13. The change rule notification unit 14 may be arbitrary means as long as the means prevent other than the terminal Ia from wiretapping.

(S213d, S223d) The frame sending/receiving unit 31 of the terminal Ia stores the change rule wherein the above-mentioned notification has been received, and subsequently, performs sending or receiving of a frame while changing to the next MAC address each time the valid period expires in accordance with the change rule thereof. Also, the transfer unit of the authentication switch performs sending or receiving of a frame using the MAC address corresponding to the valid period in accordance with the MAC conversion table. Each apparatus determines the valid period with reference to the above-mentioned counter.

Here, an assumption has been made that the terminal Ia counts the number of sent frames, and the authentication switch 5 counts the number of received frames, but conversely, an arrangement may be made wherein the terminal Ia counts the number of received frames, and the authentication switch 5 counts the number of sent frames. Also, the sum of the number of sent frames and the number of received frames may be counted. Alternatively, the frame length may be counted rather than the number of frames.

Note that with the present embodiment, there is a possibility that, before and after expiration of the valid period of an MAC address, the number of sent frames and the number of received frames might not be necessarily in agreement between the sending side apparatus and the receiving side apparatus due to the influence of discarding of a frame occurring within the apparatus on a network, or the like. In preparation for such a case, it is desirable before and after change of the MAC address (e.g., five seconds earlier and five seconds later) for the terminal and the authentication switch to be able to receive either of the addresses before and after change.

Fifth Embodiment

With the present embodiment, assuming that the frame sending/receiving counter 35 of the terminal is omitted from the fourth embodiment, description will be made regarding an arrangement wherein the authentication switch 5, as with the fourth embodiment, issues an instruction (applies a trigger) of change timing of the terminal MAC address to the terminal 1 by counting the number of received frames for each port.

The configuration of the communication system according to the present embodiment is the same as that in the fourth embodiment, but which does not need the frame sending/receiving counter 35.

Also, the operation of the communication system according to the present embodiment is the same as that in the fourth embodiment, but the processing in the steps S212d, S213d, S222d, and S223d has been modified as below.

(S212d, S222d) Upon detecting the expiration of the valid period of an MAC address based on the number-of-frames counter and change rule within the authentication switch, the change rule notification unit 14 notifies the authenticated terminal (MAC address=N) of a change rule for the port 8a. The change rule is held by the change rule management unit 13. The change rule notification unit 14 may be arbitrary means as long as the means prevent other than the terminal Ia from wiretapping. The notification content is a change rule (i.e., a terminal MAC address to be used by the terminal Ia from now on), and further, reception itself of a change rule becomes the trigger of change of the MAC address change rule for the terminal Ia.

(S213d, S223d) The frame sending/receiving unit 31 of the terminal Ia stores the change rule wherein the above-mentioned notice is received, and subsequently, the frame sending/receiving unit 31 of the terminal Ia performs sending or receiving of a frame with the notified terminal MAC address in accordance with the change rule thereof until the next notification is received. Also, the transfer unit 21 of the authentication switch 5 performs sending or receiving of a frame with the notified MAC address until the next notification is performed by the change rule notification unit 14.

Note that as with the fourth embodiment, it is desirable before and after change of the MAC address (e.g., five seconds earlier and five seconds later) for the terminals 1 and the authentication switch 5 to be able to receive either of the addresses before and after change.

According to the present embodiment, the terminal 1 needs to perform neither time synchronization nor counting of the number of sent/received frames.

Sixth Embodiment

With the present embodiment, assuming that the frame sending/receiving counter 35 is omitted from the fourth embodiment, description will be made regarding an arrangement wherein the authenticated terminal 1, as with the fourth embodiment, issues a request (applies a trigger) of change of an MAC address to the authentication switch 5 by counting the number of sent frames, and obtains the notification of a change rule from the authentication switch 5.

The configuration of the communication system according to the present embodiment is the same as that in the fourth embodiment, but does not need the frame sending/receiving counter 35.

Also, the operation of the communication system according to the present embodiment is the same as that in the fourth embodiment, but the processing S212d, S213d, S222d, and S223d is modified as below.

(S212d, S222d) Upon detecting that the expiration of the valid period of an MAC address is approaching based on the frame sending/receiving counter 35 and change rule within the terminal Ia, the frame sending/receiving unit 31 on the terminal Ia of which the authentication has been completed requests the authentication switch 5 of the notification of a change rule. A request interval may be set on the UI by the user, or may be set by the frame sending/receiving unit 31 automatically.

(S213d, S223d) The change rule notification unit 14 on the authentication switch 5, which has received the request, notifies the authenticated terminal (MAC address=N) of a change rule for the port 8a. The operation thereafter is the same as that in the fifth embodiment.

According to the present embodiment, the authentication switch 5 needs neither time synchronization nor counting of the sent/received frames.

Seventh Embodiment

With the present embodiment, description will be made regarding an arrangement wherein the terminal 1 and the authentication switch 5 hold a terminal MAC address list beforehand, and the change rule notification unit notifies only the pointer as to the list.

First, description will be made regarding the configuration of a communication system according to the present embodiment.

Figure 19:
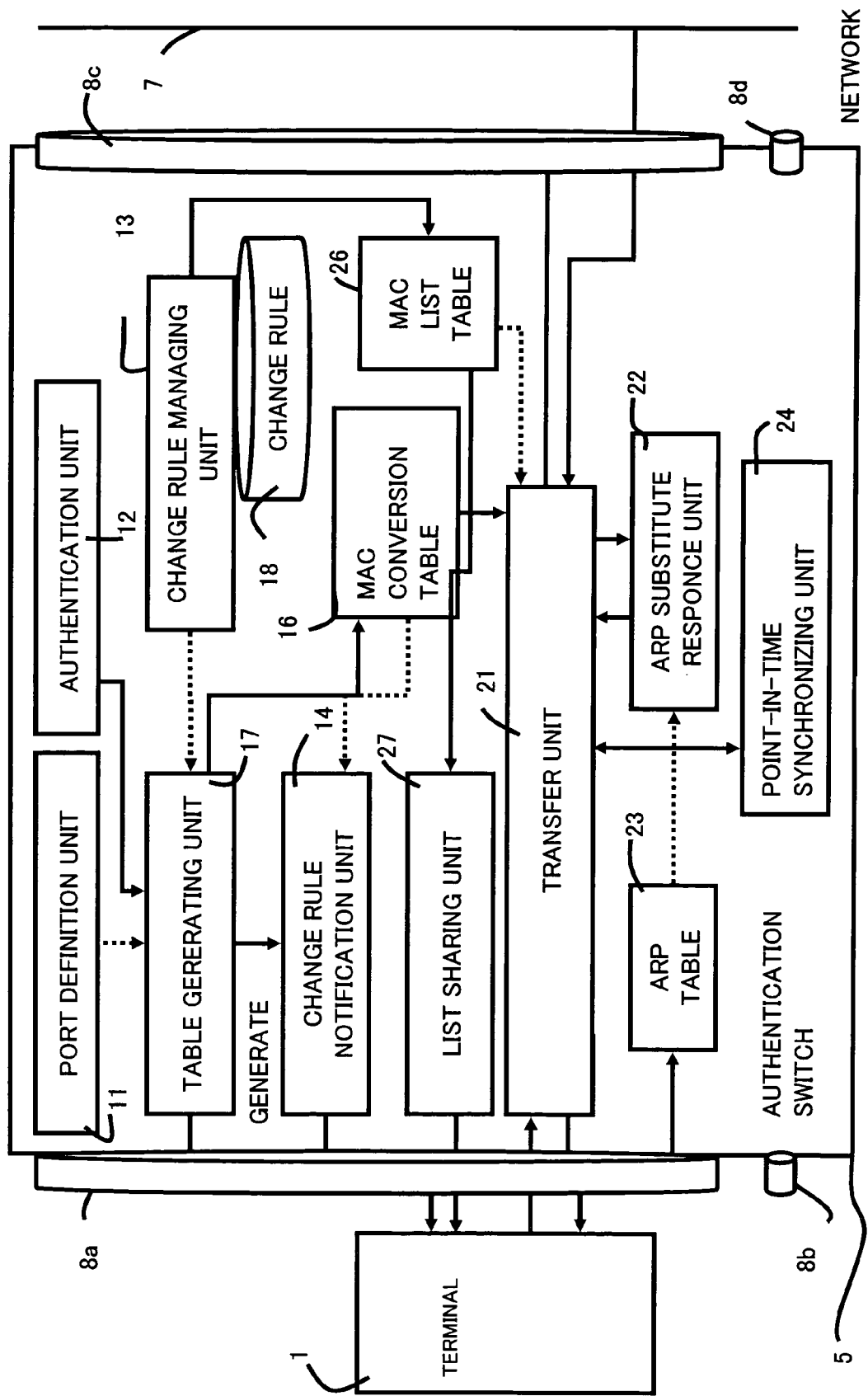
FIG. 19 is a block diagram illustrating one example of the configuration of an authentication switch according to a seventh embodiment.

FIG. 19 is a block diagram illustrating one example of the configuration of an authentication switch according to the seventh embodiment. The same reference numerals as those in FIG. 1 represent the same objects or equivalent objects shown in FIG. 1, so description thereof will be omitted here. When compared with the first embodiment, the authentication switch 5 is further provided with an MAC list table 26, and a list sharing unit 27, but does not need the point-in-time synchronizing unit 24.

Figure 20:
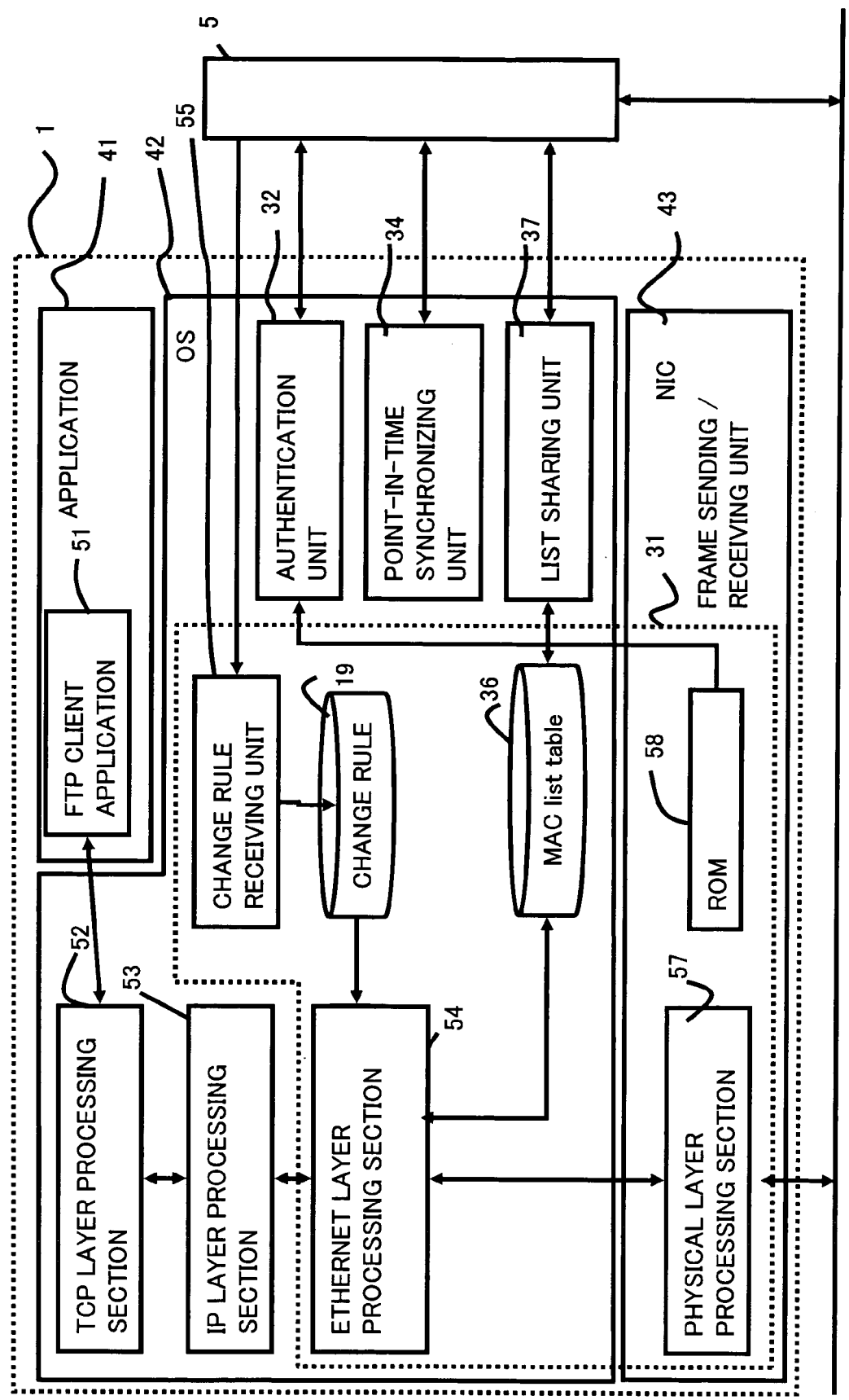
FIG. 20 is a block diagram illustrating one example of the configuration of a terminal according to the seventh embodiment.
Figure 21A:
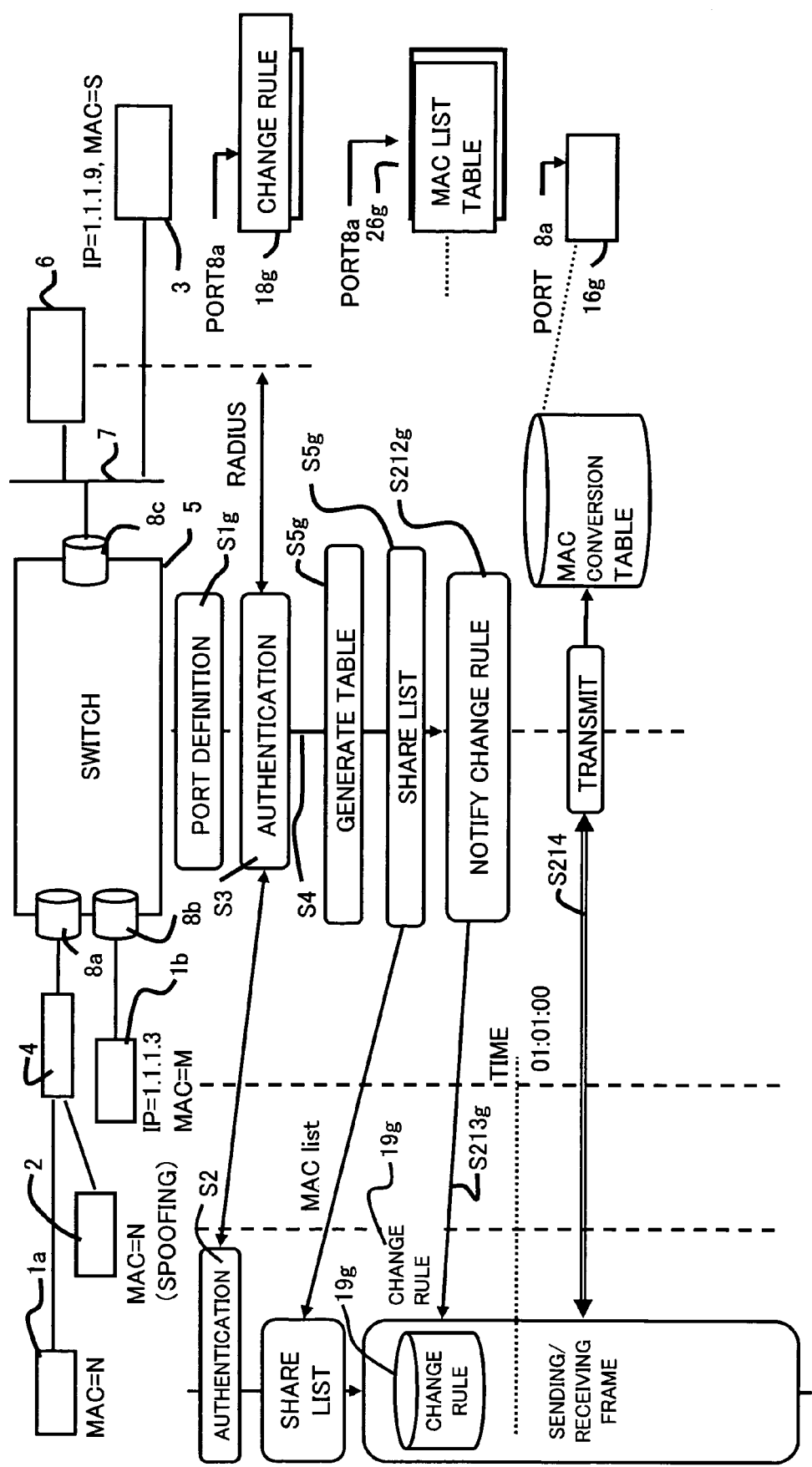

FIG. 20 is a block diagram illustrating one example of the configuration of a terminal according to the seventh embodiment. The same reference numerals as those in FIG. 2 represent the same objects or equivalent objects shown in FIG. 2, so description thereof will be omitted here. When compared with the first embodiment, the terminal 1 is further provided with an MAC list table 36, and a list sharing unit 37, but does not need the point-in-time synchronizing unit 34.

Next, description will be made regarding the operation of the communication system according to the present embodiment.

The operation of the communication system according to the present embodiment is the same as that in the first embodiment, but the change rule notification processing differs from that in the first embodiment. FIG. 21A, FIG. 21B, FIG. 21C, FIG. 21D, and FIG. 21E constitute a sequence diagram illustrating one example of the operation of the change rule notification processing according to the seventh embodiment. The same reference numerals as those in FIG. 9A, FIG. 9B, FIG. 9C, and FIG. 9D represent the same objects or equivalent objects shown in FIG. 9A, FIG. 9B, FIG. 9C, and FIG. 9D, so description thereof will be omitted here. When compared with the first embodiment, processing S1g is executed instead of the processing S1, processing S5g is executed instead of the processing S5, processing S212g is executed instead of the processing S212, and processing S213g is executed instead of the processing S213.

(S1g) Let us say that with the authentication switch 5, the same setting as that in the first embodiment has been performed using each setting UI. The change rule management unit 13 automatically generates a change rule, such as a terminal MAC address changing once every minute, for just ten minutes worth, as to each ON-set port. After that, the change rule management unit 13 repeats the same processing until ten minutes elapse. Here, the change rule management unit 13 generates a terminal MAC address using the same algorithm as the first embodiment. Also, the change rule management unit 13 stores the generated terminal MAC address in an MAC list table 26g. For example, let us say that the MAC list table 26g has 56 terminal MAC addresses, and a pointer (index) arranged to specify a terminal MAC address within the MAC list table 26g is 8 bits (0 through 511).

Processing S2 through S4 is the same as that in the first embodiment.

(S5g) The table generating unit 17 instructs generation of an MAC conversion table 16g. At this time, not an MAC address itself but a pointer as to the relevant entry of the MAC list table 26g generated by the change rule management unit 13 is stored in the MAC conversion table 16g. Further, the table generating unit 17 generates an ARP table 23 for the ARP substitute response unit 22 regarding the terminal 1 under the ON-set port. The table generating unit 17 activates the list sharing unit 27 within the authentication switch 5 after the generation thereof. The list sharing unit 27 notifies each of the terminals Ia and Ib of the content of the MAC conversion table 16g just once. The list sharing unit 37 within the terminal Ia stores the notified content in the MAC list table 36 within the terminal Ia. Next, the table generating unit 17 activates the change rule notification unit 14. Subsequently, the table generating unit 17 performs the processing S1g by the expiration of the valid period of a terminal MAC address.

(S212g) The change rule notification unit 14 notifies the authenticated terminal Ia (MAC address=N) of a change rule for the port 8a. A terminal MAC address to be notified in a change rule is not the MAC address itself but a pointer as to the list sent beforehand.

(S213g) The frame sending/receiving unit 31 of the terminal Ia stores the received change rule. Subsequently, the frame sending/receiving unit 31 obtains a pointer corresponding to the valid period in the change rule 19g, obtains the terminal MAC address pointed with this pointer in the MAC list table 36, and performs sending or receiving of a frame using this terminal MAC address. Similarly, the transfer unit 21 of the authentication switch 5 obtains a pointer corresponding to the valid period in the MAC conversion table 16g, obtains the terminal MAC address pointed with this pointer in the MAC list table 26, and performs sending or receiving of a frame using this terminal MAC address.

According to the above-mentioned operation, when a change rule is notified between the authentication switch 5 and the terminal 1, an MAC address (6×8 bits) is not passed each time but only a pointer (8 bits) defined with the MAC list tables 26 and 36 is passed, thereby improving information efficiency.

Note that with regard to how to share the MAC list tables 26 and 36 between the authentication switch 5 and the terminal 1, the user may set the table to each apparatus through a UI, or the table stored and set within the authentication switch at the time of UI settings or shipping may be passed to the terminal, or the tables may be stored in the authentication switch and the terminal at the time of shipping or the like beforehand.

Eighth Embodiment

With the present embodiment, description will be made regarding an arrangement wherein the terminal and the authentication switch hold an MAC address generating algorithm beforehand, and the change rule notification unit 14 notifies only the input of the algorithm.

First, description will be made regarding the configuration of a communication system according to the present embodiment.

Figure 22:
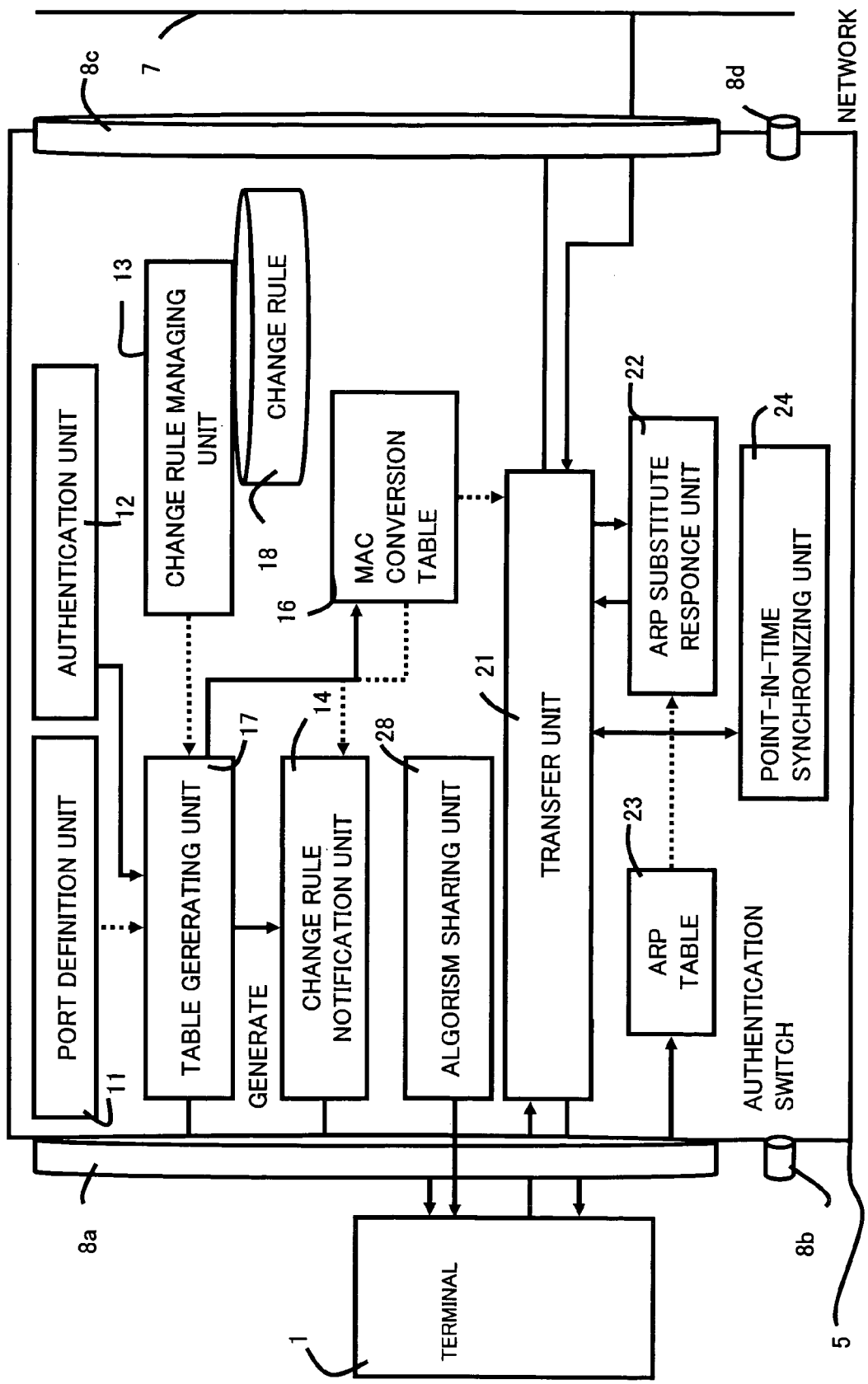
FIG. 22 is a block diagram illustrating one example of the configuration of an authentication switch according to an eighth embodiment.

FIG. 22 is a block diagram illustrating one example of an authentication switch according to the eighth embodiment. The same reference numerals as those in FIG. 1 represent the same objects or equivalent objects shown in FIG. 1, so description thereof will be omitted here. When compared with the first embodiment, the authentication switch 5 is further provided with an algorithm sharing unit 28.

Figure 23:
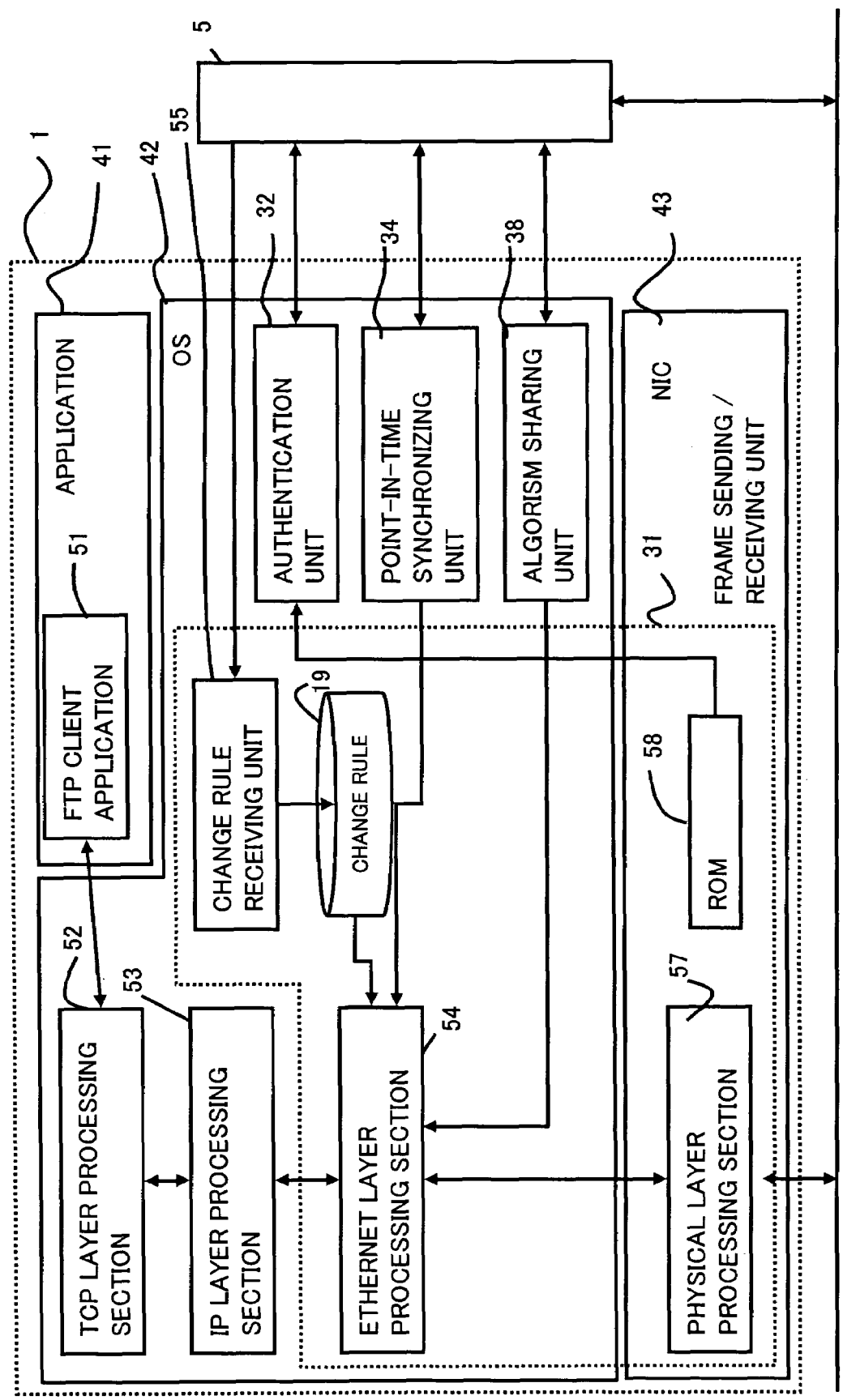
FIG. 23 is a block diagram illustrating one example of the configuration of a terminal according to the eighth embodiment.

FIG. 23 is a block diagram illustrating one example of a terminal according to the eighth embodiment. The same reference numerals as those in FIG. 2 represent the same objects or equivalent objects shown in FIG. 2, so description thereof will be omitted here. As compared to the first embodiment, the terminal 1 is further provided with an algorithm sharing unit 38.

The algorithm sharing units 28 and 38 include the same MAC address generating algorithm wherein one terminal MAC address is generated from one input parameter a (alpha).

Next, description will be made regarding the operation of the communication system according to the present embodiment.

Figure 24A:
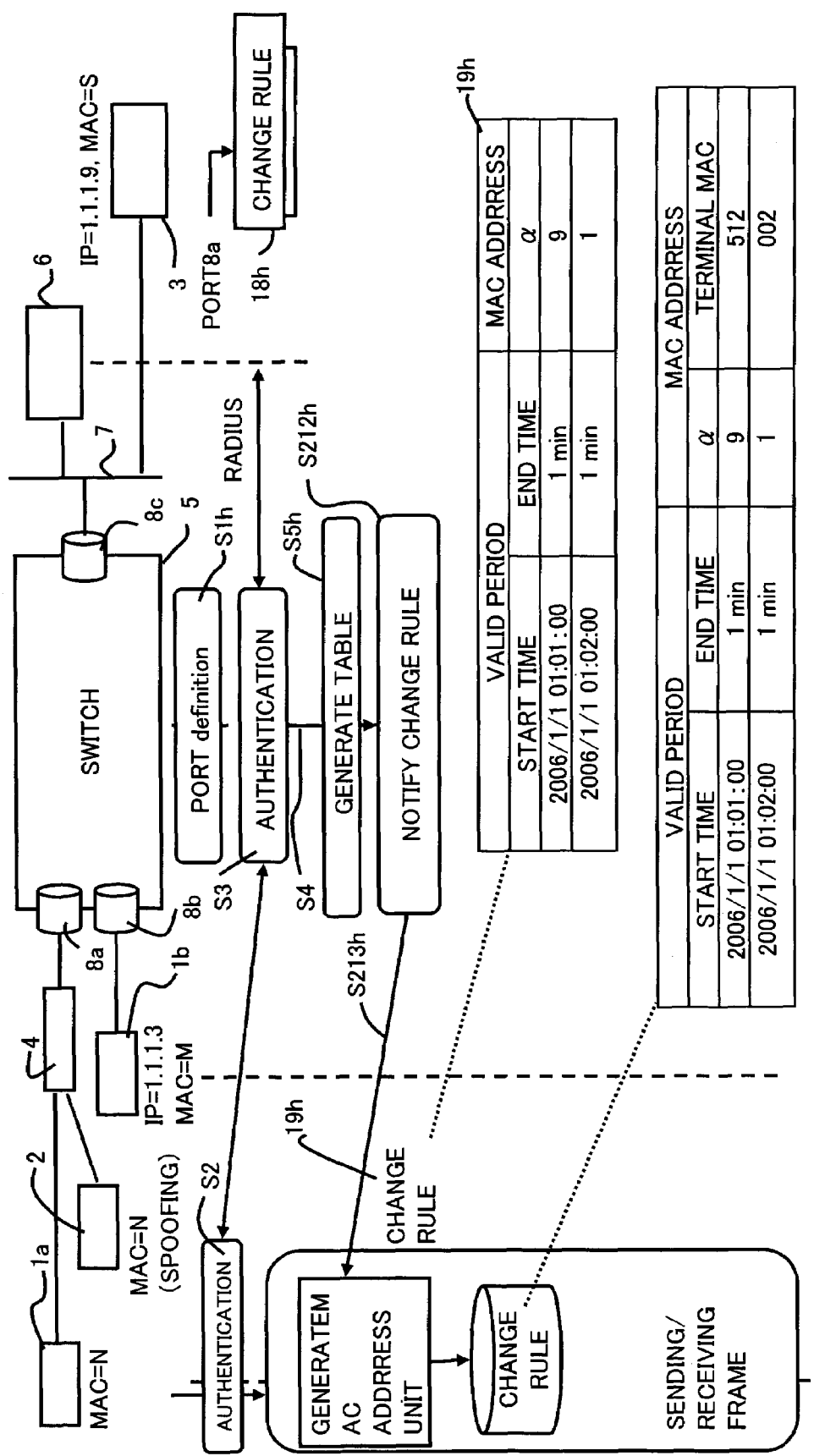
FIG. 24A and FIG. 24B constitute a sequence diagram illustrating one example of the operation of change rule notification processing according to the eighth embodiment.
Figure 24B:
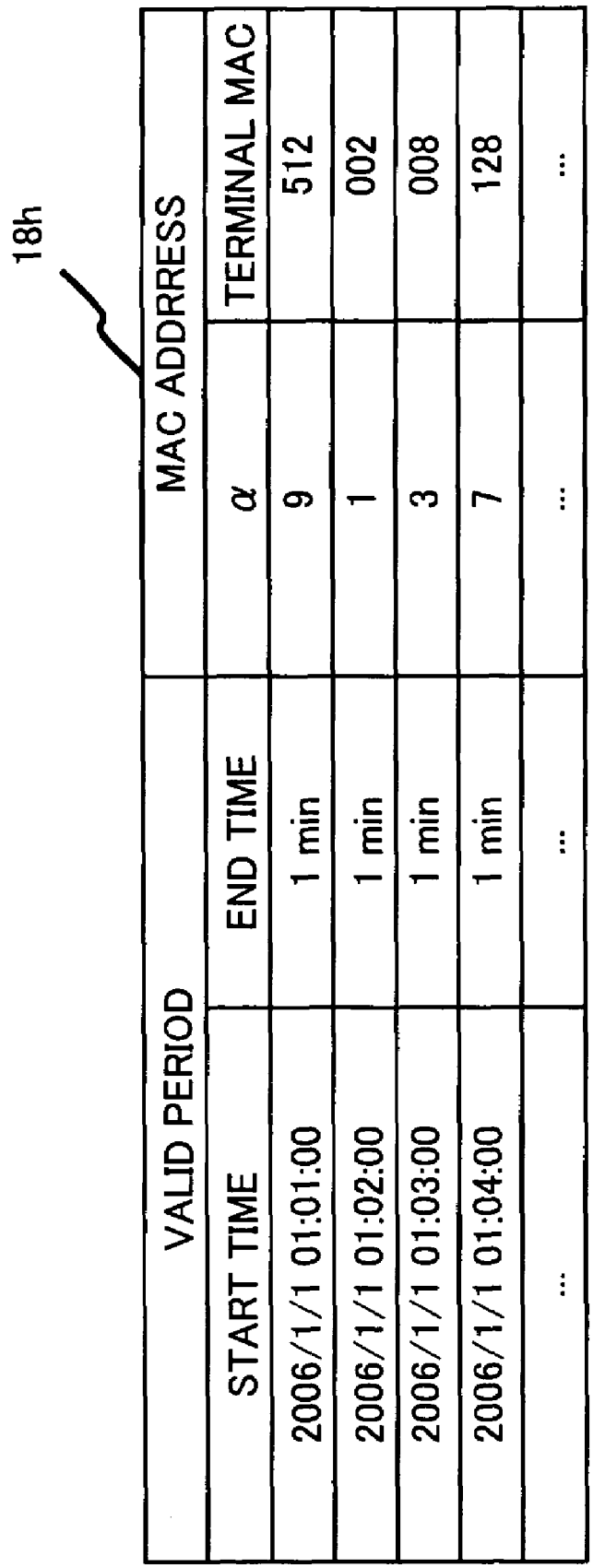

The operation of the communication system according to the present embodiment is the same as that in the first embodiment, but the change rule notification processing differs from that in the first embodiment. FIG. 24A and FIG. 24B are a sequence diagram illustrating one example of the operation of the change rule notification processing according to the eighth embodiment. The same reference numerals as those in FIG. 21A, FIG. 21B, FIG. 21C, FIG. 21D, and FIG. 21E represent the same objects or equivalent objects shown in FIG. 21A, FIG. 21B, FIG. 21C, FIG. 21D, and FIG. 21E, so description thereof will be omitted here. When compared with the seventh embodiment, processing S1h is executed instead of the processing S1g, processing S5h is executed instead of the processing S5g, processing S212h is executed instead of the processing S212g, and processing S213h is executed instead of the processing S213g.

(S1h) Let us say that with the authentication switch 5, the same setting as that in the first embodiment have been performed using each setting UI. The change rule management unit 13 automatically generates a change rule 18h, such as a terminal MAC address changing once every minute, for just ten minutes worth, as to each ON-set port. After that, the change rule management unit 13 repeats the same processing until ten minutes elapse. Now, let us say that the MAC address generating algorithm in the MAC address generating units 28 and 38 is 2^a (alpha) (a (alpha)=0 through 40).

Processing S2 through S4 is the same as that in the first embodiment.

(S5h) The table generating unit 17 instructs the generation of an MAC conversion table 16. At this time, an input parameter a (alpha) of the MAC address generating algorithm is stored in the MAC conversion table, rather than \an MAC address itself. Also, the table generating unit 17 further generates an ARP table 23 for the ARP substitute response unit 22 regarding the terminals Ia and Ib under the ON-set port. Subsequently, the table generating unit 17 activates the algorithm sharing unit 28 within the authentication switch 5. The algorithm sharing unit 28 notifies each terminal 1 of the MAC address generating algorithm only once. The algorithm sharing unit 38 within the terminal 1 stores the notified MAC address generating algorithm in the frame sending/receiving unit 31 within the terminal 1. Subsequently, the table generating unit 17 activates the change rule notification unit 14.

Subsequently, the table generating unit 17 performs the above-mentioned processing by the expiration of the valid period of a terminal MAC address.

(S212h) The change rule notification unit 14 transmits a change rule employing the input parameter a (alpha) of the MAC address generating algorithm to the terminal Ia instead of the pointer according to the seventh embodiment.

(S213h) The frame sending/receiving unit 31 of the terminal Ia stores the received change rule. Subsequently, the frame sending/receiving unit 31 obtains the input parameter a (alpha) corresponding to the valid period in the change rule 19h, calculates a terminal MAC address by inputting this input parameter a (alpha) to the MAC address generating algorithm, and performs sending or receiving of a frame using this terminal MAC address. Similarly, the transfer unit 21 of the authentication switch 5 obtains the input parameter a (alpha) corresponding to the valid period in the MAC conversion table 16g, calculates a terminal MAC address by inputting this input parameter a (alpha) to the MAC address generating algorithm, and performs sending or receiving of a frame using this terminal MAC address.

According to the above-mentioned operation, when a change rule is notified between the authentication switch 5 and the terminal 1, an MAC address (6×8 bits) is not passed each time but only an input parameter (a (alpha)=0 through 40) of the MAC address generating algorithm is passed, thereby improving information efficiency.

Note that with regard to how to share the MAC address generating algorithm between the authentication switch 5 and the terminal 1, the user may set the algorithm to each apparatus through a UI, or the algorithm stored and set within the authentication switch at the time of UI settings or shipping may be passed to the terminal, or the algorithm may be stored in the authentication switch and the terminal at the time of shipping or the like beforehand.

Ninth Embodiment

With the present embodiment, description will be made regarding an arrangement wherein in the event that the authentication switch 5 receives an MAC address different from assumption, the authentication switch 5 notifies an alarm to the effect that there is suspicion of an unauthorized terminal.

The configuration of a communication system according to the present embodiment is the same as that in the first embodiment.

The operation of the communication system according to the present embodiment is the same as that in the first embodiment, but the processing S22 in the case C is modified as below.

(S22) The receiving port of a frame which the authentication switch 5 received is the port 8a (ON-set port), and the point in time is 01:01:05 Jan. 1, 2006, so the transfer unit 21 discards the frame based on the transfer processing, and concurrently, generates an apparatus alarm to the effect that there is suspicion of faking regarding the port 8a which received the frame thereof and the terminal MAC address N. Further, the transfer unit 2.1 notifies the administrator of the authentication switch 5 on the network of an apparatus alarm.

According to the present embodiment, even if an unauthorized user can wiretap or reacquire the next MAC address each time the valid period of the MAC address of an authorized terminal expires, faking is detected by the system, thereby improving the safety of the system.

Tenth Embodiment

With the present embodiment, description will be made regarding an arrangement wherein the program of the frame sending/receiving unit 31 on the terminal 1 is distributed from the server.

First, description will be made regarding the configuration of a communication system according to the present embodiment.

The configuration of the authentication switch 5 according to the present embodiment is the same as that in the first embodiment.

Figure 25:
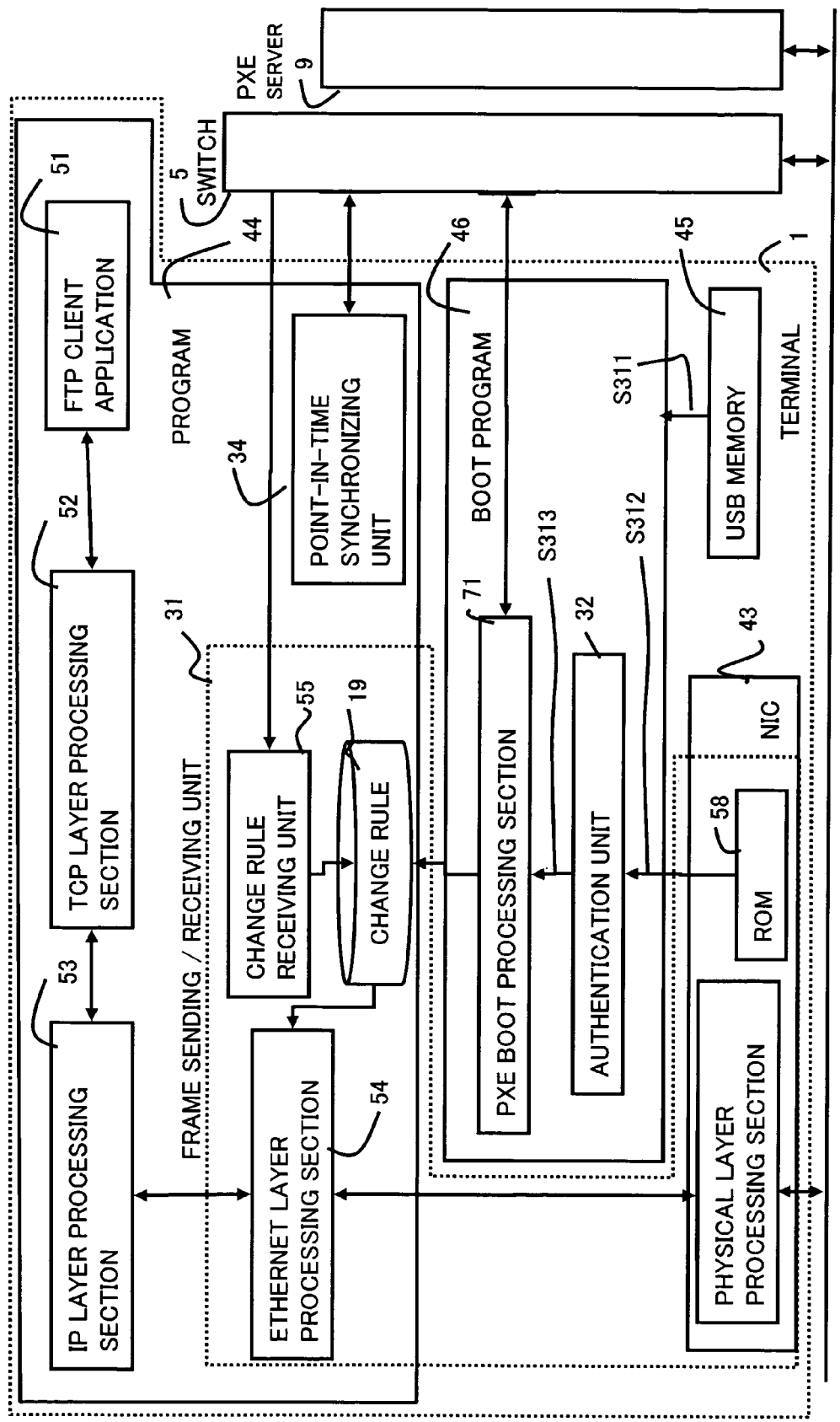
FIG. 25 is a block diagram illustrating one example of the configuration of a terminal according to a ninth embodiment.

FIG. 25 is a block diagram illustrating one example of a terminal according to the tenth embodiment. The same reference numerals as those in FIG. 2 represent the same objects or equivalent objects shown in FIG. 2, so description thereof will be omitted here. When compared with the first embodiment, the terminal 1 is further provided with USB memory 45, and a boot program 46 arranged to be loaded in the memory of the terminal 1 at the time of booting the terminal 1 to perform PXE (Preboot eXecution Environment) boot. A PXE boot processing unit 71 and authentication unit 32 make up the boot program 46. The Ethernet layer processing section 54, change rule receiving unit 55, change rule 19, physical layer processing section 57, and ROM 58 make up the frame sending/receiving unit 31.

The PXE boot is also referred to as a network boot. The terminal 1 does not need a disk, and includes a minimum function called a PXE client function on the ROM 58 of the NIC 43. The terminal 1 including this function performs the following operation (PXE boot) at the time of start-up.

Next, description will be made regarding the overview of the operation at the time of booting the terminal 1.

(S311) With the BIOS (Basic Input Output System) of the terminal 1, a boot device is set in the USB memory 45 beforehand, and upon booting being performed, the boot program stored in the USB memory 45 is loaded in the memory of the terminal 1, and activated.

(S312) The authentication unit 32 reads in the terminal MAC address unique to the NIC 43 stored in the ROM 58, and performs authentication processing with the authentication switch 5.

(S313) The authentication unit 32 gives a PXE boot processing unit 71 an instruction of operation.

(S314) The PXE boot processing unit 71 performs PXE boot processing.

Next, description will be made regarding the operation of the communication system according to the present embodiment.

Figure 26B:
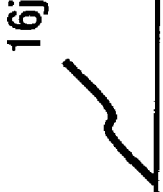
Figure 29A:
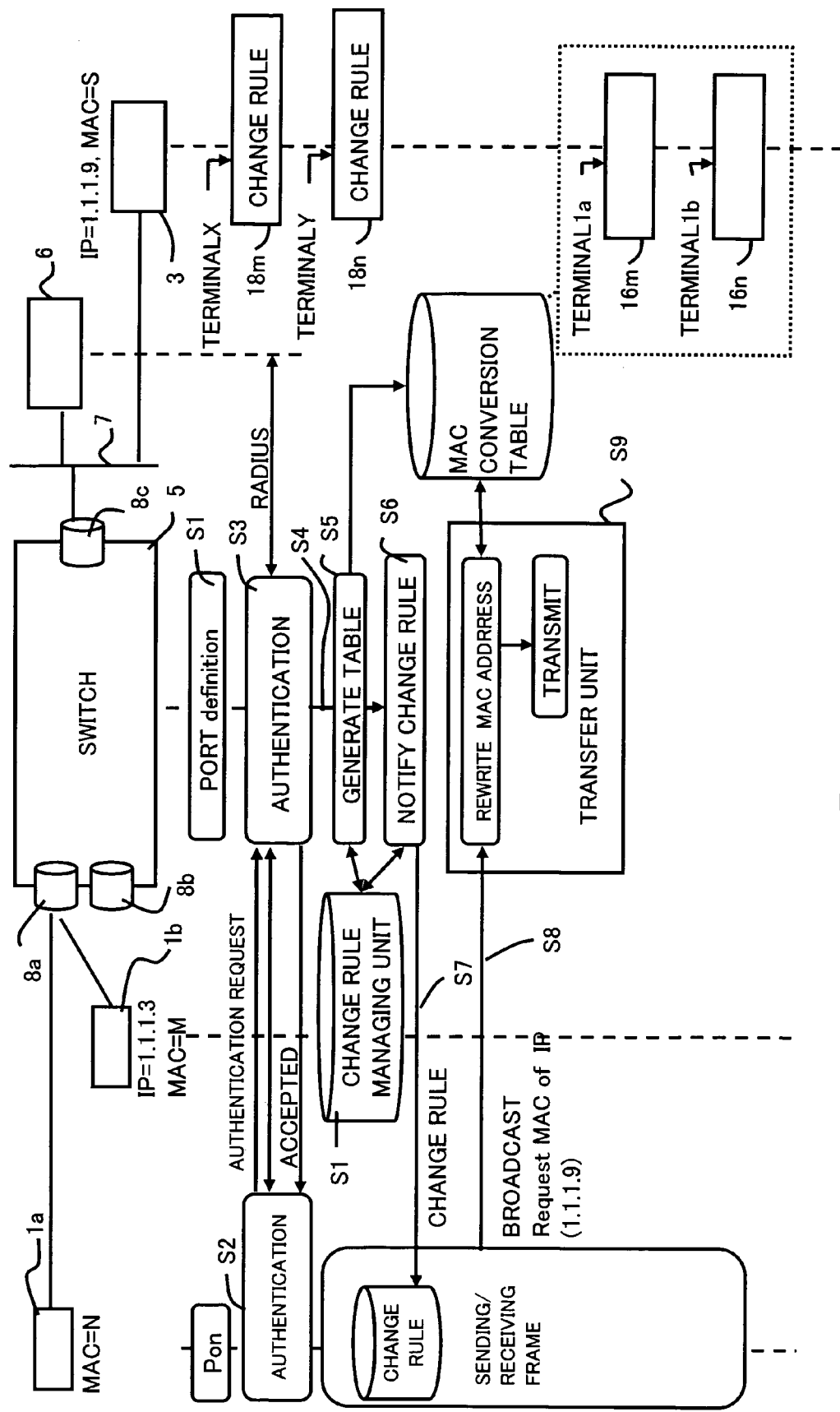

The operation of the communication system according to the present embodiment is the same as that in the first embodiment, but the change rule notification processing differs from that in the first embodiment. FIG. 26A and FIG. 26B constitute a sequence diagram illustrating one example of the operation of the communication system according to the tenth embodiment. In this drawing, the same reference numerals as those in FIG. 4A, FIG. 4B, FIG. 4C, and FIG. 4D represent the same objects or equivalent objects shown in FIG. 4A, FIG. 4B, FIG. 4C, and FIG. 4D, so description thereof will be omitted here. With the present embodiment, the operation of a PXE server 9 is also shown. Here, the above-mentioned authentication processing is the same as the processing S1 through S5 in the first embodiment, but the table generating unit 17 generates a MAC conversion table 16*j* which includes neither a valid period nor a substitute MAC address, and also does not perform the conversion of a terminal MAC address.

(S321, S322) The PXE boot processing unit 71 obtains an IP address using a DHCP (Dynamic Host Configuration Protocol) of the PXE server 9, and also obtains a PXE boot server address.

(S323, S324) The PXE boot processing unit 71 downloads an OS and a program using the file server function of the PXE server 9. Next, the PXE boot processing unit 71 loads an OS 42, an application 41, and so forth, which are distributed from the PXE server, in the memory of the terminal 1, and activates these.

(S325) Subsequently, the terminal 1 and the authentication switch 5 perform communication by performing the same MAC address conversion processing (e.g., S1 through S22) as that in the first embodiment.

The present embodiment enables the frame sending/receiving unit 31 on the terminal 1 to be obtained from the PXE server 9, whereby the time and effort relating to addition/modification of a program as to the terminal 1 can be markedly reduced.

Note that with the present embodiment, description has been made assuming that the PXE server 9 is a different apparatus from the authentication switch 5, but the PXE server 9 may be one function within the authentication switch 5. Also, the PXE boot processing unit 71 may be means configured to obtain a program other than the PXE boot function. Also, description has been made wherein the boot program 46 is stored in the USB memory 45, but the boot program 46 may be stored in another storage means as long as the means are activated at the time of booting the terminal 1.

Eleventh Embodiment

With the above-mentioned embodiments, an arrangement has been assumed wherein a frame format is the existing Ethernet frame format itself, and only an MAC address is rewritten. With the present embodiment, description will be made regarding a case wherein a header, indicating which valid period the MAC address pertains to, is inserted in a frame to be sent or received between the terminal 1 and the authentication switch 5.

FIG. 27 is a diagram illustrating one example of a frame format according to the eleventh embodiment. The authentication switch 5 according to the present embodiment employs a common Ethernet frame 81 as a frame to be sent or received at an OFF-set port, but also employs a frame 82 with a valid period header as a frame to be sent or received at an ON-set port. Unlike the frame format of a common Ethernet frame 81, with the frame format of a frame 82 with a valid period header, a type 83 having a value indicating a valid period header, and a valid period ID 84 which is a valid period identifier are newly inserted in the header. The valid period ID 84 is, for example, a value indicating the end time of a valid period.

The present embodiment enables which valid period the MAC address within a frame pertains to, to be clearly distinguished even before and after the expiration of valid period of the MAC address.

Twelfth Embodiment

With the present embodiment, description will be made regarding a case wherein the setting of ON/OFF of MAC address conversion processing according to the present invention is performed as well as the setting of ON/OFF of authentication as to each port.

The configuration and operation of a communication system according to the present embodiment are the same as those in the first embodiment, but the operation of the port definition unit 11 differs from that in the first embodiment.

FIG. 28 is a screen illustrating one example of a port setting UI according to the twelfth embodiment. When compared with the port setting UI in FIGS. 5A, 5B and 5C, the port setting UI according to the present embodiment includes an authentication ON/OFF setting item corresponding to the ON/OFF setting item, and is further provided with an MAC address conversion ON/OFF setting item. In the event that the MAC address conversion setting is ON, the authentication switch 5 performs the MAC address conversion processing according to the present invention, but in the event that the MAC address conversion setting is OFF, the authentication switch 5 performs the operation of the conventional authentication switch without converting a terminal MAC address.

The present embodiment enables an existing IEEE802.1x authenticated terminal, and a terminal to which the MAC address conversion processing according to the present invention is applied, to coexist.

Thirteenth Embodiment

With the present embodiment, description will be made regarding an arrangement wherein multiple authorized terminals are accommodated under one port.

The configuration of a communication system according to the present embodiment is the same as that in the first embodiment.

Next, description will be made regarding the operation of a communication system according to the present embodiment. FIG. 29A, FIG. 29B FIG. 29C FIG. 29D, and FIG. 29E constitute a sequence diagram illustrating one example of the operation of the communication system according to the thirteenth embodiment. In this drawing, the same reference numerals as those in FIG. 4A, FIG. 4B, FIG. 4C, and FIG. 4D represent the same objects or equivalent objects shown in FIG. 4A, FIG. 4B, FIG. 4C, and FIG. 4D, so description thereof will be omitted here. When compared with the first embodiment, processing Sim is executed instead of the processing Si, and processing S5m is executed instead of the processing S5.

(Sim) Let us say that with the authentication switch 5, the same setting as that in the first embodiment has been performed at each setting UI. However, a substitute MAC address is set at the substitute MAC address setting UI, but is not correlated with a port. The change rule management unit 13 automatically generates a change rule, such as a terminal MAC address changing once every minute, for just ten minutes worth, as to each ON-set port. After that, the change rule management unit 13 repeats the same processing until ten minutes elapse. The change rule management unit 13 manages a change rule not for each port but for each terminal. Now, let us say that generated change rules 18m and 18n are appended with the indexes of unknown terminals X and Y respectively.

The processing S2 through S4 is the same as that in the first embodiment.

(S5m) The table generating unit 17 instructs the generation of MAC conversion tables 16m and 16n. At this time, the table generating unit 17 assigns an unused change rule to a new terminal of which the authentication has been completed, of the change rules which the change rule management unit 13 manages. For example, the change rule of the terminal X is now not used, so is applied to the terminal Ia. Also, of the values input at the substitute MAC address setting UI, an unused substitute MAC address A is assigned to the terminal Ia.

Subsequently, the same processing as that in the first embodiment is executed.

The present embodiment enables multiple authorized terminals to be disposed under one port.

Note that a setting unit corresponds to the port definition unit, change rule management unit, and table generating unit according to the embodiments. Also, a notification unit corresponds to the change rule notification unit according to the embodiments. Also, an ARP response unit corresponds to the ARP substitute response unit according to the embodiments. Also, an obtaining unit corresponds to the change rule receiving unit according to the embodiments. Also, a sending/receiving unit corresponds to the Ethernet layer processing section according to the embodiments. Also, a download unit corresponds to the PXE boot processing unit according to the embodiment.

Also, setting steps correspond to the processing of the port definition unit, change rule management unit, and table generating unit according to the embodiments. Also, notification steps correspond to the processing of the change rule notification unit according to the embodiments. Also, transfer steps correspond to the processing of the transfer unit according to the embodiments.

Further, with a computer making up a network relay apparatus, a program arranged to execute the above-mentioned respective steps can be provided as a network relay program. Storing the above-mentioned program in a computer-readable recording medium enables the computer making up a network relay apparatus to execute the program. Here, examples of the above-mentioned computer-readable recording medium include an internal storage apparatus implemented in the computer such as ROM, RAM, or the like, a portable-type storage medium such as CD-ROM, a flexible disk, DVD disc, magneto-optical disc, IC card, or the like, a database holding a computer program, or another computer and the database thereof, and further a transmission medium on a circuit.

FIG. 30 is a sequence diagram illustrating one example of the operation of a communication system prior to application of the present example thereto. FIG. 30 illustrates the operations of two terminals 2, an authentication switch 105, a RADIUS (Remote Authentication Dial-In User Service) server (authentication server) 6. Also, in this drawing, the terminals 2 are connected to a port 108a of the authentication switch 105 via a repeater 4. A port 108c of the authentication switch 105 is connected to the RADIUS server 6 via a network 7. Description will be made below regarding the operation (S1001 through S1004) of the conventional communication system.

(S1001) The authentication switch 105 performs MAC address filtering arranged to cutoff all frames other than authentication frames in an initial state. With the setting of the MAC address filtering, an MAC address, and permission/prohibition are shown for each receiving port. With a setting 109a of the MAC address filtering at this time, all the MAC addresses are assumed to be prohibited at the receiving port 108a. It can be determined based on the destination MAC address (01:80:C2:00:00:03) or Ethernet Type value (0x888e) of the frame whether or not a frame is an authentication frame.

(S1002) Upon power supply being turned on, the terminals 2 transmit an authentication request frame to the authentication switch 105.

(S1003) The authentication switch 105 performs authentication processing in cooperation with the RADIUS server 6 based on the authentication key within a frame received from the terminal. The authentication key is an identifier (ID) or password manually input from a terminal user, or a value read from an Integrated Circuit (IC) card held by a user.

(S1004) In the event that authentication has been accepted, the authentication switch 105 regards the user on the terminal thereof as an authorized user, and clears cutoff as to the terminal thereof (hereafter, also referred to as an authorized terminal). With a setting 109b of the MAC address filtering at this time, the MAC address N of the authorized terminal is assumed to be permitted at the receiving port 108a, and the other MAC addresses are assumed to be prohibited. According to the IEEE802.1x regulation, cutoff of the port stored in the relevant terminal is cleared, but as for common implementation, in order to improve security, cutoff of the relevant port is cleared only as to the sending source MAC address of the authentication frame received at the time of authentication.

However, the authentication switch 105 in FIG. 30 determines whether or not transfer (network access) can be performed only based on the receiving port and the MAC address of a frame, even after authentication using the authentication key. At this time, the above-mentioned communication system causes a problem wherein an unauthorized user having no authorized authentication key obtains the MAC address of an authorized terminal by wiretapping or the like of communication exchanged between a terminal and an authentication switch, fakes the MAC address of that terminal using the obtained MAC address, and consequently the unauthorized user can achieve network access.

Also, there is a method arranged to encrypt all the frames between an authorized terminal and a switch so as to prevent network access by faking an MAC address alone. With this method, after completion of IEEE802.1x authentication, a terminal and an authentication switch periodically exchange an encryption key on an encrypted channel which cannot be observed from other terminals, and all the frames are encrypted between the terminal and the authentication switch using this encrypted key. The encrypted channel is a channel realized with an arrangement of challenge & response or the like, so another terminal not participating in this exchange does not know the encryption key, and consequently, an unauthorized user fails to perform terminal faking. With this method, the authentication switch determines based on a receiving port, MAC address, and encryption key whether or not a frame can be transferred, whereby durability as to terminal MAC address faking can be improved as compared with the operation of the original IEEE802.1x.

However, this method requires encryption/decryption of all the frames, which causes a problem of increase in the processing load relating to encryption/decryption at the authentication switch. In light of the fact that Gbps-order wired communication is becoming commonplace, encryption/decryption of all the frames is unrealistic. Also, with a layer which is equal to or greater than layer 3, encryption is frequently performed using IPsec (Security Architecture for Internet Protocol)/SSL (Secure Socket Layer) or the like, and accordingly, it can also be said to be redundant to further encrypt all the frames in layer 2.

The above-described present embodiments prevent MAC address faking, and also can provide a network relay program, a network relay apparatus, a communication system, and a network relay method, whereby frame transfer processing can be performed efficiently.

What is claimed is:

1. A method for controlling a relay device connected to another relay device and a plurality of terminal devices via a network, the relay device relaying a frame between the plurality of terminal devices and the other relay device, the method comprising:

selecting a Media Access Control address as a first address of a terminal device, among a group of addresses containing different addresses based on a rule for selecting the first address, the first address being used between the relay device and the terminal device;

sending to the terminal device pointer information for selecting the first address among the group of addresses stored in the terminal device;

receiving a frame containing an address of a device that transmitted the frame;

judging whether the received address included in the frame is the first address selected based on the rule;

producing a converted frame by converting the received address included in the frame as received into a second Media Access Control address of the first terminal device used between the relay device and the other relay device when the received address included in the frame is the first address selected based on the rule; and transmitting the converted frame to the other relay device.

2. The method according to the claim 1, further comprising:

receiving a frame from the other relay device to the terminal device; and converting the second Media Access Control address included in the frame into the first address based on the rule.

3. The method according to the claim 1, further comprising, authenticating the terminal device when said relay device receives a request for connecting from the terminal device.

4. The method according to the claim 1, further comprising, responding from said relay device to the terminal device upon receiving an ARP request of the terminal device.

5. The method according to the claim 1, wherein the first address is selected by time defined by the rule.

6. The method according to the claim 5, wherein said time is expressed with date and time of executing changing the first address.

7. The method according to the claim 5, wherein said time is expressed with a period for using the first address.

8. The method according to the claim 1, wherein the first address is selected by a number of frames defined by the rule, each of the frames including the first address used to communicate between said relay device and the terminal device.

9. A relay device, connected to another relay device and terminal devices via a network, for relaying a frame between the terminal devices and the other relay device, comprising:

a first transmitting module configured to transmit information to one of the terminal devices, the information including Media Access Control addresses as first addresses identifying the one of the terminal devices, a rule for selecting one of the first addresses and pointer information for selecting the one of the first addresses, the first addresses being shared between the one of the terminal devices and said relay device;

a first storage configured to provide a Media Access Control address as a second address identifying the one of the terminal devices, the second address being shared between said relay device and the other relay device;

a second storage configured to provide a table for associating the first addresses with the second address based on the rule;

a receiving module configured to receive a frame from the one of the terminal devices to the other relay device;

a processor configured to judge whether the one of the first addresses included in the frame is selected by the rule and convert the one of the first addresses included in the frame into the second address based on the table when the one of the first addresses included in the frame is selected by the rule; and a second transmitting module configured to transmit the converted frame to the other relay device.

10. A non-transitory computer readable medium storing a program for controlling a relay device connected to another relay device and terminal devices via a network, the relay device relaying a frame between the terminal devices and the other relay device, to execute a process comprising:

selecting a Media Access Control address as a first address of a terminal device among a group of addresses containing different addresses based on a rule for selecting the first address, the first address being used between the relay device and the terminal devices;

sending to the terminal device pointer information for selecting the first address among the group of addresses stored in the terminal device;

receiving a frame containing an address of a device that transmitted the frame;

judging whether the received address included in the frame is the first address selected based on the rule;

producing a converted frame by converting the received address included in the frame as received into a second Media Access Control address of the first terminal device used between the relay device and the other relay device when the received address included in the frame is the first address selected based on the rule; and transmitting the converted frame to the other relay device.

11. A communication device that communicates with another communication device, the communication device comprising:

a storage device that stores a list of different addresses and a rule received from the other communication device for changing a Media Access Control address identifying the communication device, the rule from the other communication device containing pointer information that identifies one of the different addresses in the list; and a transmitting module configured to change the Media Access Control address, identifying the communication device, to a changed Media Access Control address, by selecting the one of the different addresses from the list based on the pointer information received from the other communication device, to generate information in which the changed Media Access Control address is included and to transmit the information generated to the other communication device.

* * * * *